(12) United States Patent
Minassa et al.

(10) Patent No.: US 11,187,060 B2
(45) Date of Patent: Nov. 30, 2021

(54) HYDRAULIC CONTROL SYSTEM FOR INDEX DOWNHOLE VALVES

(71) Applicant: Halliburton Energy Services, Inc., Houston, TX (US)

(72) Inventors: Lorenzzo Breda Minassa, Tomball, TX (US); Jonathan Joubran, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/339,427

(22) PCT Filed: May 23, 2018

(86) PCT No.: PCT/US2018/034152
§ 371 (c)(1),
(2) Date: Apr. 4, 2019

(87) PCT Pub. No.: WO2019/226160
PCT Pub. Date: Nov. 28, 2019

(65) Prior Publication Data
US 2021/0102440 A1    Apr. 8, 2021

(51) Int. Cl.
*F16K 31/122*    (2006.01)
*E21B 34/10*     (2006.01)
*E21B 43/12*     (2006.01)

(52) U.S. Cl.
CPC .............. *E21B 34/10* (2013.01); *E21B 43/12* (2013.01); *F16K 31/1225* (2013.01); *F16K 31/1226* (2013.01)

(58) Field of Classification Search
CPC .. F16K 31/1225; F16K 31/1226; E21B 34/10; E21B 43/12
See application file for complete search history.

(56) References Cited

U.S. PATENT DOCUMENTS 3,568,717 A    3/1971  Plate et al.
4,102,128 A    7/1978  Shafer et al.
(Continued)

FOREIGN PATENT DOCUMENTS

CA    2821553 A1    8/2010
GB    2379685 A     3/2003
(Continued)

OTHER PUBLICATIONS

"Formation Isolation Valve", Schlumberger, 2009, 8 pgs.
(Continued)

*Primary Examiner* — Umashankar Venkatesan
(74) *Attorney, Agent, or Firm* — Haynes and Boone, LLP

(57) ABSTRACT

A method and apparatus for controlling a control valve. A primary line is pressurized to move according to an operating sequence to move a first piston within a first housing from a reset position to a close position such that a first control valve is switched to a closed state. The primary line is pressurized according to the operating sequence to move the first piston within the first housing from the close position to an open position such that the first control valve is switched to an open state. The secondary line is pressurized according to the operating sequence to move the first piston within the first housing back into the reset position.

20 Claims, 16 Drawing Sheets

(56) References Cited

U.S. PATENT DOCUMENTS

| | | |
|---|---|---|
| 6,470,970 B1 | 10/2002 | Purkis et al. |
| 6,502,640 B2 | 1/2003 | Rayssiguier et al. |
| 6,722,439 B2 | 4/2004 | Garay et al. |
| 7,434,619 B2 | 10/2008 | Rossi et al. |
| 7,520,033 B2 | 4/2009 | Clarner |
| 7,845,416 B2 | 12/2010 | Turner et al. |
| 8,056,643 B2 | 11/2011 | Basmajian et al. |
| 8,215,408 B2 | 7/2012 | Yapici |
| 8,640,769 B2 | 2/2014 | Smith et al. |
| 8,776,890 B2 | 7/2014 | Basmajian et al. |
| 9,127,528 B2 | 9/2015 | Panian |
| 2002/0020524 A1* | 2/2002 | Gano ............ E21B 43/108 166/55 |
| 2002/0066573 A1 | 6/2002 | Patel |
| 2003/0056951 A1* | 3/2003 | Kaszuba ............ E21B 34/14 166/250.01 |
| 2003/0089407 A1 | 5/2003 | Bento |
| 2005/0263279 A1* | 12/2005 | Vachon ............ E21B 23/006 166/250.01 |
| 2009/0308588 A1* | 12/2009 | Howell ............ E21B 23/006 166/66.4 |
| 2010/0269935 A1 | 10/2010 | Breunig et al. |
| 2017/0261120 A1 | 9/2017 | Miller et al. |
| 2017/0306990 A1 | 10/2017 | Goldfarb |

FOREIGN PATENT DOCUMENTS

| | | |
|---|---|---|
| JP | 2013/024345 A | 2/2013 |
| WO | WO 1997/003293 A1 | 1/1997 |
| WO | WO 2009/033042 A1 | 3/2009 |
| WO | WO 2009/111192 A2 | 9/2009 |
| WO | WO 2015/026354 A1 | 2/2015 |

OTHER PUBLICATIONS

International Search Report and The Written Opinion of the International Search Authority, or the Declaration, dated Feb. 19, 2019, PCT/US2018/034152, 10 pages, ISA/KR.

International Search Report and The Written Opinion of the International Search Authority, or the Declaration, dated Feb. 15, 2019, PCT/US2018/034157, 10 pages, ISA/KR.

Rahman et al., "*Second-Generation Interval Control Valve (ICV) Improves Operational Efficiency and Inflow Performance in Intelligent Completions*", Society of Petroleum Engineers, 2012, p. 1-13.

* cited by examiner though it were more particularly, to an apparatus and method for controlling one or more valves, and more one index piston that is moved into a plurality of index

HYDRAULIC CONTROL SYSTEM FOR INDEX DOWNHOLE VALVES

CROSS-REFERENCE TO RELATED APPLICATION

The present application is a U.S. National Stage patent of International Patent Application No. PCT/US2018/034152, filed on May 23, 2018, and entitled "Hydraulic Control System For Index Downhole Valves," which is related to International Patent Application No. PCT/US2018/034157, filed May 23, 2018, and entitled "Dual Line Hydraulic Control System to Operate Multiple Downhole Valves," the entire disclosures of which are hereby incorporated herein by reference.

TECHNICAL FIELD

The present disclosure relates generally to an apparatus and method for controlling one or more valves, and more particularly, to an apparatus and method for hydraulically opening and closing one or more control valves using at least one index piston that is moved into a plurality of index positions using a primary hydraulic line and a secondary hydraulic line that extend to the surface of a well.

BACKGROUND

Different types of control valves are used in wellbores to control the flow of fluid into and out of an oil and gas reservoir. A control valve may be, for example, an isolation valve, an internal control valve, or some other type of valve. Isolation valves are typically used downhole to isolate an oil and gas reservoir from the production string. Isolation valves may be used in a broad range of applications including, but not limited to, fluid loss control, underbalanced perforating, well control barrier operations, lubrication, and multi-zone isolation. Interval control valves may be used to provide remote zonal flow control by choking, permitting, or preventing fluid production or fluid injection from or into the oil and gas reservoir.

Controlling a control valve may include, for example, opening and closing the control valve. Typically, control valves are controlled using mechanical systems. For example, a control valve in a well completion system may include a J-slot mechanism that controls the opening and closing of the control valve. A J-slot mechanism may include a track for an actuating cam or pin that may combine rotation and up or down movement to control the opening and closing of a control valve. In some cases, the parts used in mechanical systems may not have the longevity or service life desired when used for controlling control valves in wellbores. Further, some currently available mechanical systems may not provide the flexibility desired when controlling the state of a control valve.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Illustrative embodiments and related methods of the present disclosure are described below as they might be employed in a hydraulic control system for a set of valves and method of operating the same. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

Figure 1:
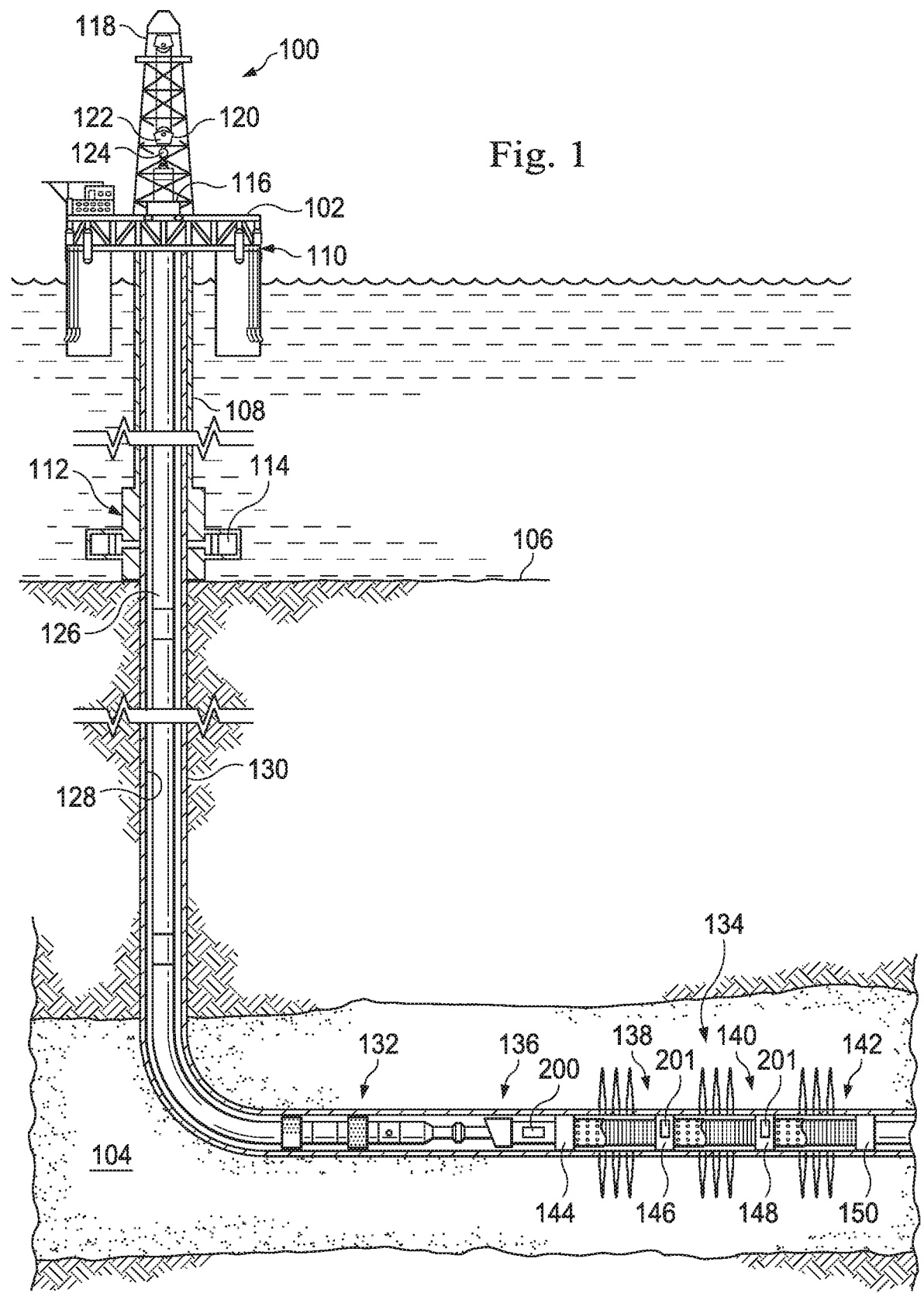
FIG. 1 is a schematic illustration of an offshore oil and gas platform coupled to a set of control valves and a control system for the set of control valves, according to an example embodiment of the present disclosure.

FIG. 1 is a schematic illustration of an offshore oil and gas platform, generally designated 100. A semi-submersible platform 102 may be positioned over a submerged oil and gas formation 104 located below a sea floor 106. A subsea conduit 108 may extend from a deck 110 of the semi-submersible platform 102 to a subsea wellhead installation 112, including blowout preventers 114 or a subsea tree (e.g. a subsea Christmas tree). The semi-submersible platform 102 may have a hoisting apparatus 116, a derrick 118, a travel block 120, a hook 122, and a swivel 124 for raising and lowering pipe strings, such as a substantially tubular, axially extending tubing string 126.

A borehole or wellbore 128, extends through the various earth strata including the submerged oil and gas formation 104, with a portion of the wellbore 128 having a casing string 130 cemented therein. Disposed in the wellbore 128 are an upper completion assembly 132 at a lower end of the tubing string 126 and a lower completion assembly 134 in a substantially horizontal portion of the wellbore 128. The upper completion assembly 132 and the lower completion assembly 134 may be coupled together using a latch assembly 136 to place the lower completion assembly 134 in communication with the upper completion assembly 132. In some embodiments, the latch assembly 136 is considered part of the lower completion assembly 134. In other embodiments, the latch assembly 136 is omitted. The lower completion assembly 134 includes at least one flow regulating system, such as flow regulating system 138, flow regulating system 140, or flow regulating system 142, and may include various other components, such as a packer 144, a packer 146, a packer 148, and a packer 150.

In one or more embodiments, a control system 200 may be used to control a set of control valves 201. The control system 200 is a hydraulic control system. The set of control valves 201 may be used to control the flow of fluid into, out of, and/or within the wellbore 128. Each control valve in the set of control valves may take the form of an isolation valve, an internal control valve, a pressure-regulating valve, a safety valve, some other type of control valve, or a combination thereof.

The set of control valves may be disposed within or relative to various portions of the wellbore 128. In one example embodiment, an isolation valve may be disposed within the portion of the wellbore 128 extending through the submerged oil and gas formation 104 to isolate the submerged oil and gas formation 104 from the interior passageway of the tubing string 126. In another example embodiment, an interval control valve (ICV) may be implemented within upper completion assembly 132 or lower completion assembly 134 to provide remote zonal flow control by choking, permitting, or preventing fluid production or injection between the submerged oil and gas formation 104 and an interior passageway of the tubing string 126.

Even though FIG. 1 depicts a horizontal wellbore, it should be understood by those skilled in the art that the apparatus according to the present disclosure is equally well suited for use in wellbores having other orientations including vertical wellbores, slanted wellbores, uphill wellbores, multilateral wellbores or the like. Accordingly, it should be understood by those skilled in the art that the use of directional terms such as "above," "below," "upper," "lower," "upward," "downward," "uphole," "downhole" and the like are used in relation to the illustrative embodiments as they are depicted in the figures, the upward direction being toward the top of the corresponding figure and the downward direction being toward the bottom of the corresponding figure, the uphole direction being toward the surface of the well, the downhole direction being toward the toe of the well. Also, even though FIG. 1 depicts an offshore operation, it should be understood by those skilled in the art that the apparatus according to the present disclosure is equally well suited for use in onshore operations. Further, even though FIG. 1 depicts a cased hole completion, it should be understood by those skilled in the art that the apparatus according to the present disclosure is equally well suited for use in open hole completions.

Figure 2:
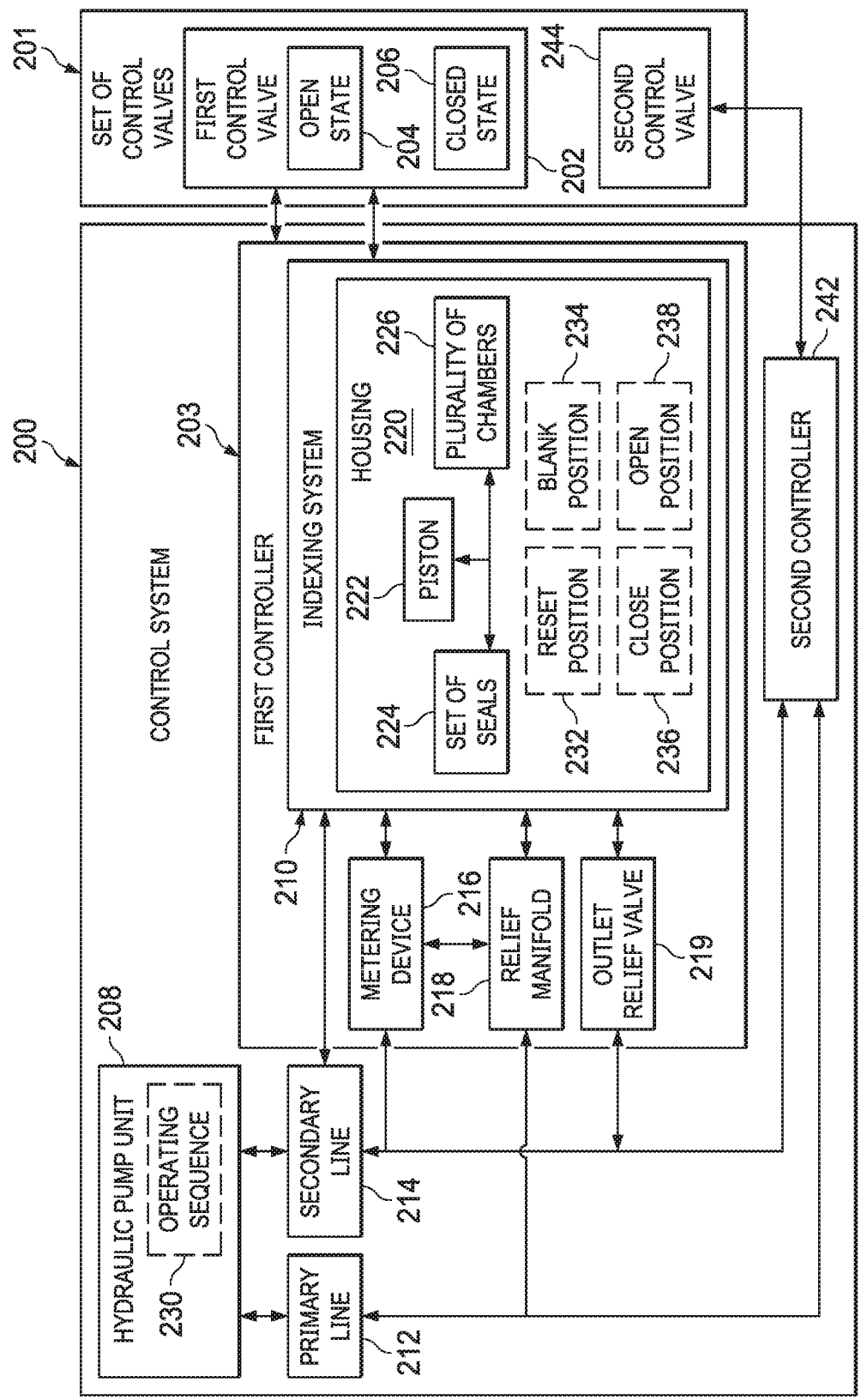
FIG. 2 is a block diagram of the control system for the set of control valves, according to an example embodiment of the present disclosure.

FIG. 2 is a block diagram of the control system 200 for the set of control valves 201. The control system 200 may include a controller for controlling each control valve of the set of control valves 201, which may include one or more control valves. In one embodiment, the set of control valves 201 includes a first control valve 202 and the control system 200 includes a first controller 203 for controlling the first control valve 202.

The first control valve 202 may be used at any of a number of points along the tubing string 126, the upper completion assembly 132, and/or the lower completion assembly 134 to control the flow of fluid into, out of, and/or within the interior passageways of the tubing string 126, the upper completion assembly 132, and/or the lower completion assembly 134. The first control valve 202 may take the form of an isolation valve, an internal control valve, a pressure-regulating valve, a safety valve, some other type of valve, or a combination thereof. The first controller 203 may be used to control operation of the first control valve 202. In particular, the first controller 203 may control a state of the first control valve 202. In other words, the first controller 203 controls the opening and closing of the first control valve 202.

For example, the first controller 203 may operate the first control valve 202 to switch the first control valve 202 at least between an open state 204 and a closed state 206. In the open state 204, the first control valve 202 may be fully open to allow the flow of hydraulic fluid through the first control valve 202. In the closed state 206, the first control valve 202 may be fully closed to prevent the flow of hydraulic fluid through the first control valve 202. Further, in some embodiments, the first control valve 202 may also be capable of being partially open and partially closed simultaneously.

In addition to the first controller 203, the control system 200 may include a hydraulic pump unit 208, a primary line 212, and a secondary line 214 for controlling the first control valve 202. In one or more embodiments, the hydraulic pump unit 208 is located at the level of the semi-submersible platform 102. In other embodiments, the hydraulic pump unit 208 may be located at or near the subsea wellhead installation 112.

The hydraulic pump unit 208 is fluidly connected to the primary line 212 and the secondary line 214. In particular, the primary line 212 and the secondary line 214 extend from the hydraulic pump unit 208 to each of the controllers of the control system 200, including the first controller 203. When one component is fluidly connected to another component, the two components may be directly connected or indirectly connected through one or more other components. Further, when two components are fluidly connected, this connection may make it possible for fluid to flow between the two components. Depending on the implementation, fluid may be allowed to flow in both directions or in only one direction between the components.

The primary line 212 and the secondary line 214 are hydraulic lines that carry hydraulic fluid to and from the hydraulic pump unit 208. These hydraulic lines may be individually and independently pressurized by the hydraulic pump unit 208. Further, these hydraulic lines are fluidly connected to the first controller 203. In some embodiments, the hydraulic pump unit 208, the primary line 212, and/or the secondary line 214 may be considered part of the first controller 203.

In one or more embodiments, the first controller 203 includes an indexing system 210, a metering system 216, a relief manifold 218, and an outlet relief valve 219. Each of the primary line 212 and the secondary line 214 may be directly connected to the indexing system 210, the metering system 216, the relief manifold 218, and/or the outlet relief valve 219 through one or more other hydraulic lines, one or more valves, and/or one or more other components.

In one or more example embodiments, the indexing system 210 includes a housing 220 and a piston 222 located within the housing 220. The piston 222 is movable within the housing 220. In some embodiments, the piston 222 is translatable within the housing 220 but has a fixed rotational orientation relative to the housing 220. A plurality of seals 224 is positioned between the piston 222 and the housing 220, thereby defining a plurality of chambers 226 within the housing 220. Each of the plurality of chambers 226 may be filled with hydraulic fluid. The plurality of seals 224 may include one or more seals positioned between the piston 222 and the housing 220 such that the defined plurality of chambers 226 includes at least two chambers. In one or more embodiments, the plurality of seals 224 includes four seals that define five chambers.

The metering system 216 may be fluidly connected to at least the relief manifold 218, the secondary line 214, and the indexing system 210. The metering system 216 may be activated by the buildup pressure at the relief manifold 218 when the primary line 212 is pressurized. Further, the metering system 216 controls the volume and rate of hydraulic fluid returned from the indexing system 210.

The relief manifold 218 may be fluidly connected to the primary line 212, the indexing system 210, and the metering system 216. In one or more embodiments, the relief manifold 218 controls the flow of hydraulic fluid from the primary line 212 into a selected chamber of the plurality of chambers 226 in the housing 220 of the indexing system 210. Further, the relief manifold 218 may be used to control the buildup of pressure required to operate a pilot valve in the metering system 216.

The outlet relief valve 219 may be fluidly connected to the indexing system 210 and the secondary line 214. The outlet relief valve 219 controls a return of hydraulic fluid from the indexing system 210 into the secondary line 214.

The hydraulic pump unit 208 pressurizes the primary line 212 and the secondary line 214 individually and independently according to an operating sequence 230. The operating sequence 230 is the specific sequence for pressurizing and venting each of the primary line 212 and the secondary line 214. In other words, the operating sequence 230 is a sequence of pressure cycles, each pressure cycle including the pressurization of either the primary line 212 or the secondary line 214 and a venting operation of either the primary line 212 or the secondary line 214, respectively. In some embodiments, the hydraulic pump unit 208 is programmed to cycle through the various stages of pressurizing and venting the primary line 212 and the secondary line 214 according to the operating sequence 230. Accordingly, the first controller 203 may be considered an automated controller. In other embodiments, the hydraulic pump unit 208 may be completely or partially manually controlled.

Pressurizing the hydraulic lines according to the operating sequence 230 moves the piston 222 of the indexing system 210 into various predetermined index positions within the housing 220 of the indexing system 210 to thereby control a state of the first control valve 202. In other words, the piston 222 may be indexed to different positions that control the opening and the closing of the first control valve 202. For example, these positions may include, but are not limited to, a reset position 232, a blank position 234, a close position 236, and an open position 238.

In one example embodiment, the piston 222 may be moved from the reset position 232, to the blank position 234, to the close position 236, to the open position 238, and back to the reset position 232. In the reset position 232, the position of the piston 222 has no effect on the state of the first control valve 202. For example, when the piston 222 is in the reset position 232, the first control valve 202 may be considered equalized. Similarly, the piston 222 being in the blank position 234 has no effect on the state of the first control valve 202.

In contrast, when the piston 222 is moved into the close position 236, the first control valve 202 may be switched to the closed state 206. Further, when the piston 222 is moved into the open position 238, the first control valve 202 may be switched to the open state 204.

In other embodiments, the piston 222 may be moved from the reset position 232, to the blank position 234, to the open position 238, to the close position 236, and then back to the reset position 232. In yet other embodiments, the piston 222 may be moved from the reset position 232, to the close position 236, to the open position 238, and back to the reset position 232 without having gone through a blank position 234. For example, when the set of control valves 201 includes only the first control valve 202 such that the control system 200 includes only the first controller 203, the piston 222 may not need to be moved into the blank position 234 prior to moving the piston 222 into the close position 236.

Pressurizing the primary line 212 may move the piston 222 from the reset position 232 to the blank position 234, from the blank position 234 to the close position 236, and from the close position 236 to the open position 238. Thus, the primary line 212 may be considered a dedicated control line for the first control valve 202. Pressurizing the secondary line 214 may move the piston 222 back into the reset position 232. Thus, the secondary line 214 may function solely as a reset control line for the first controller 203.

In some embodiments, the control system 200 includes a second controller 242 and a second control valve 244. The second controller 242 and the second control valve 244 may be implemented in a manner similar to the first controller 203 and the first control valve 202, respectively.

In one or more embodiments, the second controller 242 includes all of the same components as the first controller 203 and shares the primary line 212 and the secondary line 214 with the first controller 203. The secondary line 214 may function and be used in much the same way for the second controller 242 as the primary line 212 functions and is used for the first controller 203. Further, the primary line 212 may function and be used in much the same way for the second controller 242 as the secondary line 214 functions and is used for the first controller 203. In other words, the secondary line 214 may be used to control movement of a second piston (not shown) in a second indexing system (not shown) of the second controller 242, while the primary line 212 may be used to reset the position of the second piston. Thus, the secondary line 214 may be the dedicated control line for the second control valve 244, while the primary line 212 may be the reset control line for the second controller 242.

Figure 3:
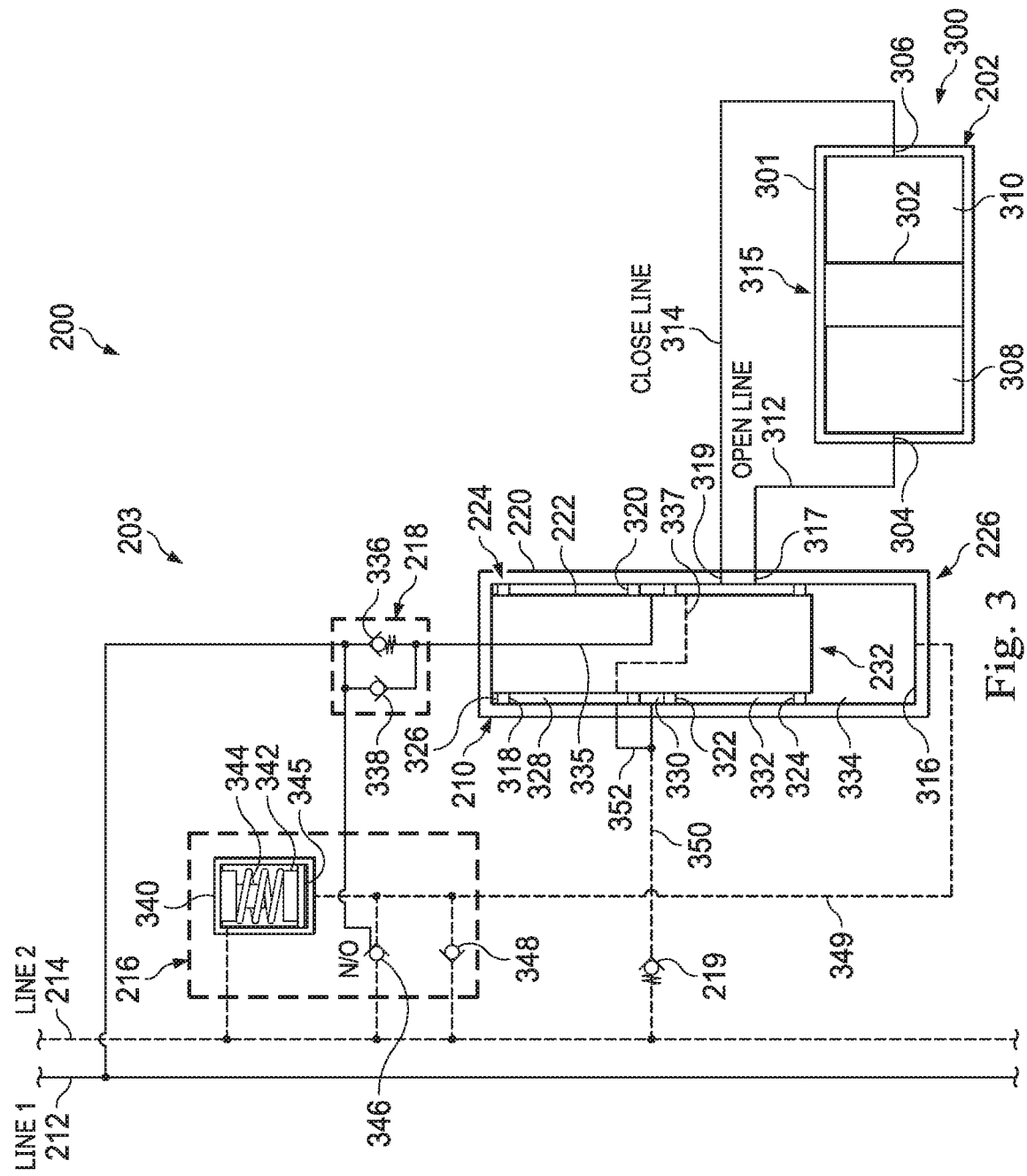
FIG. 3 is a schematic diagram of a portion of the control system from FIG. 2 that includes the first controller and the first control valve, according to an example embodiment of the present disclosure.

FIG. 3 is a schematic diagram of a portion of the control system 200 from FIG. 2 that includes the first controller 203 and the first control valve 202 according to one or more embodiments. The hydraulic pump unit 208 from FIG. 2, to which the primary line 212 and the secondary line 214 of the first controller 203 are fluidly connected, is not shown in these schematic diagrams. As illustrated in FIG. 3, the first control valve 202 is in a default state 300 such that the first control valve 202 is partially open and partially closed.

In one or more embodiments, the first control valve 202 includes a housing 301, a plunger 302, a first port 304, and a second port 306. In some embodiments, the first control valve 202 may include one or more additional components that dictate the behavior of the first control valve 202 in the open state 204 and the behavior of the first control valve in the closed state 206.

Hydraulic fluid may enter and exit the housing 301 of the first control valve 202 through each of the first port 304 and the second port 306. The movement of hydraulic fluid into and out of the housing 301 may move the plunger 302 within the housing 301. At any given moment during operation of the first controller 203 and the first control valve 202, the positioning of the plunger 302 may define a first space 308, a second space 310, or both within the housing 301 of the first control valve 202. Hydraulic fluid fills the first space 308 and the second space 310.

The first port 304 fluidly connects the first control valve 202 to an open line 312. The second port 306 fluidly connects the first control valve 202 to a close line 314. Hydraulic fluid may enter or exit the first port 304 through the open line 312. Further, hydraulic fluid may enter or exit the second port 306 through the close line 314.

In FIG. 3, the plunger 302 is shown in a default position 315, indicating that the first control valve 202 is in the default state 300. The plunger 302 being in the default position 315 defines the first space 308 and the second space 310, both of which are filled with hydraulic fluid. In the default state 300, the pressure in the first space 308 and the second space 310 may be substantially equalized such that the first control valve 202 is considered equalized. In the default state 300, the first control valve 202 may be considered half open and half closed.

When hydraulic fluid in the open line 312 enters the first control valve 202 through the first port 304, the plunger 302 may move towards the second port 306 to plug the second port 306 and put the first control valve 202 in the open state 204. In other words, the plunger 302 may reduce the second space 310 to a substantially non-existent space, thereby fully opening the first control valve 202.

When hydraulic fluid in the close line 314 enters the first control valve 202 through the second port 306, the plunger 302 moves towards the first port 304 to plug the first port 304 and put the first control valve 202 in the closed state 206. In other words, the plunger 302 may reduce the first space 308 to a substantially non-existent space, thereby fully closing the first The open line 312 and the close line 314 are fluidly connected to the indexing system 210 through a third port 317 and a fourth port 319, respectively. Accordingly, in some cases, the third port 317 and the fourth port 319 may be referred to as an open line port and a close line port, respectively. The third port 317 and the fourth port 319 may be openings in the housing 220 that allow fluid communication between these ports and some portion of the plurality of chambers 226. Which chamber of the plurality of chambers 226 that is in communication with the third port 317 and which chamber of the plurality of chambers 226 that is in communication with the fourth port 319 depend on the position of the piston 222 within the housing 220. In one or more embodiments, the indexing system 210 includes the housing 220 and the piston 222 located in the housing 220. The housing 220 has an inner wall 316 that defines an open space within which the piston 222 is located. In one or more embodiments, the housing 220 and the piston 222 are both cylindrical.

The plurality of seals 224 is positioned between the piston 222 and the inner wall 316 of the housing 220. In one or more embodiments, the plurality of seals 224 is fixedly attached to the piston 222 such that when the piston 222 moves with the housing 220, the plurality of seals 224 moves with the piston 222.

The plurality of seals 224 includes a first seal 318, a second seal 320, a third seal 322, and a fourth seal 324 positioned between the piston 222 and the inner wall 316 to define the plurality of chambers 226 in the housing 220. A seal in the plurality of seals 224 may be implemented using, for example, without limitation, an O-ring or some other type of fluid-tight seal. The plurality of chambers 226 includes a first chamber 326, a second chamber 328, a third chamber 330, a fourth chamber 332, and a fifth chamber 334. The first chamber 326, the second chamber 328, the third chamber 330, the fourth chamber 332, and the fifth chamber 334 are an index chamber, an auxiliary chamber, a control chamber, an auxiliary chamber, and a reset chamber, respectively. In one illustrative embodiment, the second chamber 328 may be referred to as a first auxiliary chamber and the fourth chamber 332 may be referred to as a second auxiliary chamber.

In one or more embodiments, the first chamber 326 is defined by the inner wall 316, the piston 222, and the first seal 318. The second chamber 328 is defined by the inner wall 316, the piston 222, the first seal 318 and the second seal 320. The third chamber 330 is defined by the inner wall 316, the piston 222, the second seal 320, and the third seal 322. The fourth chamber 332 is defined by the inner wall 316, the piston 222, the third seal 322, and the fourth seal 324. The fifth chamber 334 is defined by the inner wall 316, the piston 222, and the fourth seal 324.

The piston 222 includes a first channel 335 and a second channel 337 that allow hydraulic fluid to flow through the piston 222 and allows fluid communications between at least four of the plurality of chambers 226. The first channel 335 may allow bi-directional fluid communication between the first chamber 326 and the third chamber 330. The second channel 337 may allow bi-directional fluid communication between the second chamber 328 and the fourth chamber 332.

The relief manifold 218 controls the flow of hydraulic fluid in the primary line 212 to the indexing system 210 and controls the buildup of pressure required to activate the metering system 216. In one or more embodiments, the relief manifold 218 includes a relief valve 336 and a check valve 338. The relief valve 336 is a one-directional valve that remains closed unless the pressure in the primary line 212 at an inlet of the relief valve 336 is at or above a selected pressure threshold. In one example embodiment, the selected pressure threshold for the relief valve 336 is about 1000 psi (pounds per square inch). The check valve 338 is a one-directional valve that allows the flow of hydraulic fluid in the direction away from the indexing system 210 but blocks the flow of hydraulic fluid in the direction towards the indexing system 210.

In one or more embodiments, the metering system 216 includes a housing 340, a piston 342, a spring 344, a seal 345, a pilot valve 346, and a check valve 348. The piston 342, the spring 344, and the seal 345 are located with the housing 340. The piston may be fixedly attached to the spring 344 and is movable within the housing 340. The seal 345 may be disposed around the piston 342 and may be used to define two different spaces, or chambers, where hydraulic fluid may move. One of these chambers is fluidly connected to the fifth chamber 334 within the housing 220 of the indexing system 210 through a fluid line 349, which may be considered a segment of the secondary line 214. The check valve 348 is a one-directional valve that allows the flow of hydraulic fluid in one direction and blocks the flow of hydraulic fluid in the opposite direction.

The pilot valve 346 fluidly connects the fluid line 349 to the secondary line 214. The pilot valve 346 may be a one-directional, pilot-operated valve that remains open unless the pressure in the primary line 212 at the pilot valve 346 builds to or above a selected pressure threshold that is less than the selected pressure threshold for the relief valve 336. In other words, a flow of fluid may be allowed between the fluid line 349 and the secondary line 214 when the pilot valve 346 is open and the pressure buildup at the pilot valve 346 from the primary line 212 reaches or exceeds the selected pressure threshold. In one example embodiment, the selected pressure threshold for the pilot valve 346 is about 500 psi.

The outlet relief valve 219 fluidly connects the indexing system 210 to the secondary line 214 to allow a return of the hydraulic fluid from the indexing system 210 to the secondary line 214. In particular, a fluid line 350 fluidly connects the second chamber 328 of the indexing system 210 to the outlet relief valve 219. The outlet relief valve 219 is a one-directional valve that remains closed unless the buildup of pressure at the inlet of the outlet relief valve 219 is at or above a selected pressure threshold. In one example embodiment, this selected pressure threshold for the outlet relief valve 219 is about 1000 psi.

In one or more embodiments, the primary line 212 is a dedicated control line for controlling the operation of the indexing system 210, and thereby operation of the first control valve 202. The secondary line 214 provides hydrostatic balance for the indexing system 210, allows hydraulic fluid returns from the first control valve 202, and provides the ability to reset the indexing system 210.

With the piston 222 in the reset position 232, the open line 312 and the close line 314 are in fluid communication with the same chamber of the indexing system 210, the fourth chamber 332. When the open line 312 and the close line 314 are in fluid communication with the same chamber, the first control valve 202 may be equalized.

The piston 222 may be kept in the reset position 232 and the first control valve 202 may be kept in the default state 300 when the first controller 203 and the first control valve 202 are lowered into the wellbore 128 of FIG. 1. Both the first controller 203 and the first control valve 202 are equalized as the first controller 203 and the first control valve 202 are lowered into the wellbore 128. In particular, the primary line 212 and the secondary line 214 are equalized such that one is not more pressurized than the other.

Further, the first controller 203 includes an equalizing line 352 fluidly connected to the fluid line 350 and the indexing system 210. The equalizing line 352 helps ensure equalization as the first controller 203 and the first control valve 202 are lowered into the wellbore 128. With the piston 222 in the reset position 232, the equalizing line 352 fluidly connects the second chamber 328 with the third chamber 330. In this manner, the equalizing line 352 helps ensure equalization between all chambers of the plurality of chambers 226 of the indexing system 210.

FIGS. 4-14 are schematic diagrams describing one example implementation of the operating sequence 230 used by the first controller 203 from FIG. 3 to control operation of the first control valve 202 in FIG. 3. FIGS. 4-14 describe movement of the piston 222 from the reset position 232, to the blank position 234, to the close position 236, to the open position 238, and back to the reset position 232.

Figure 4:
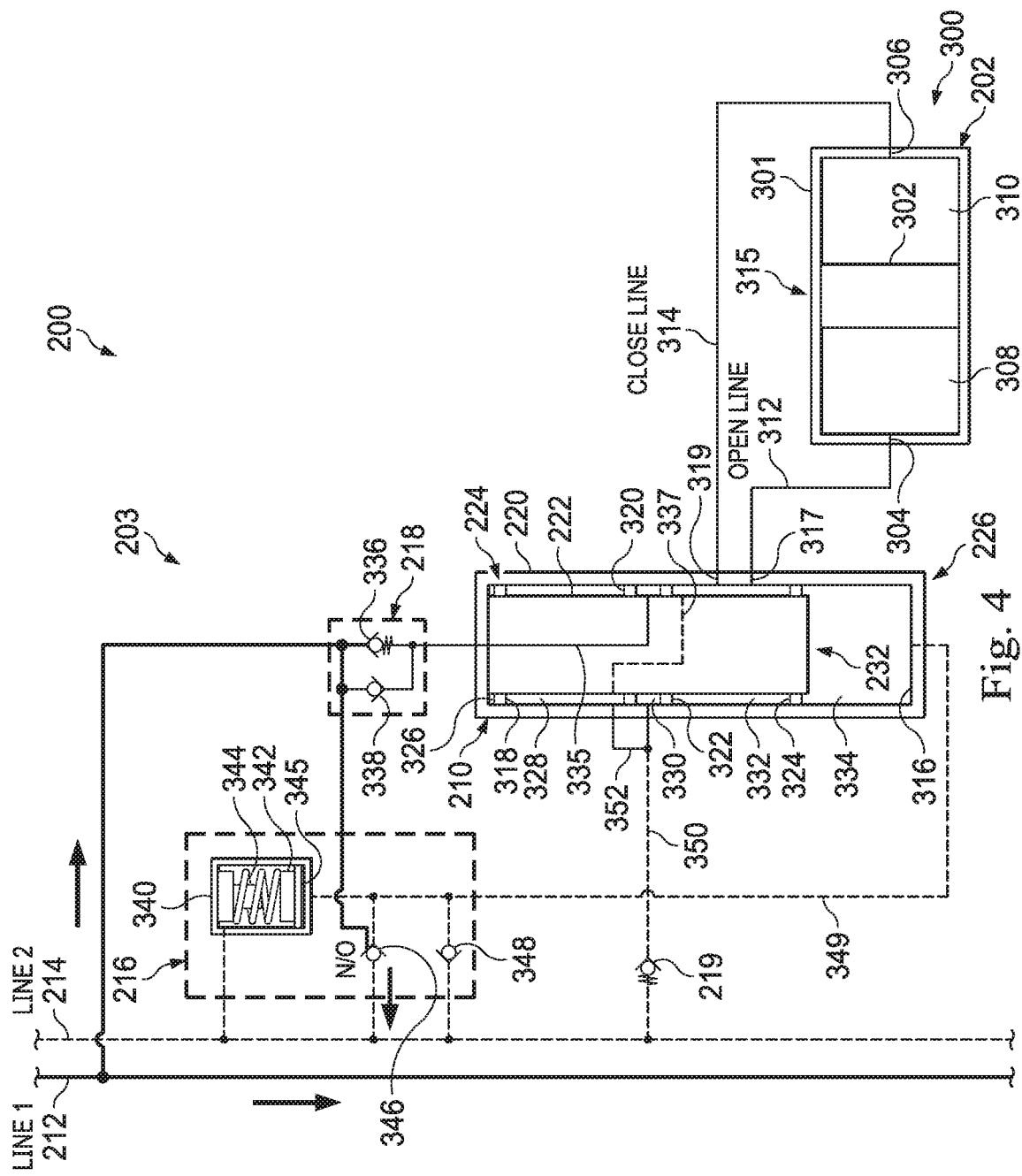
FIG. 4 is a schematic diagram of a configuration of the first controller and the first control valve of FIG. 3 during a first pressure cycle of an operating sequence, according to an example embodiment of the present disclosure.

In FIG. 4, the piston 222 is in the reset position 232. The first control valve 202 is in the default state 300 such that the first control valve 202 is partially open and partially closed. The pilot valve 346 is open, allowing fluid communication between the fluid line 349 and the secondary line 214. The relief manifold 218 prevents hydraulic fluid from moving into the first chamber 326 of the indexing system 210. In particular, the relief valve 336 is closed and the check valve 338 blocks the flow of hydraulic fluid in the direction towards the indexing system 210. Further, the outlet relief valve 219 remains closed.

To begin the operating sequence 230, the hydraulic fluid is transferred from the hydraulic pump unit 208 (not shown) into the primary line 212 to begin pressurizing the primary line 212. In one or more embodiments, the pressure in the primary line 212 has not yet reached a selected pressure threshold for the pilot valve 346. Accordingly, the pilot valve 346 remains open and the relief valve 336 remains closed. Further, the outlet relief valve 219 remains closed.

Figure 5:
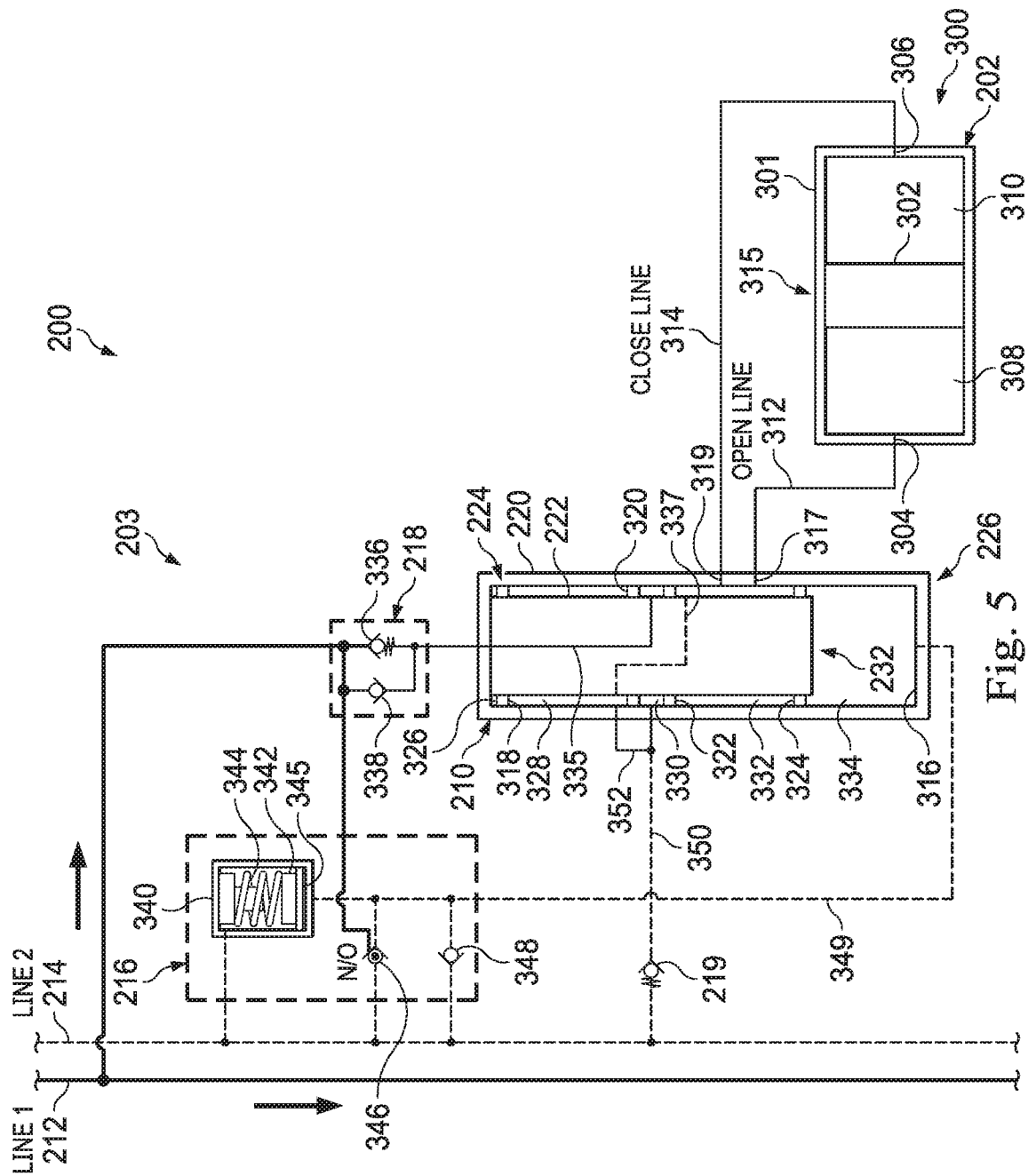
FIG. 5 is a schematic diagram of another configuration of the first controller and the first control valve of FIG. 3 during the first pressure cycle of the operating sequence, according to an example embodiment of the present disclosure.

In FIG. 5, the pressure in the primary line 212 has reached or exceeded the selected pressure threshold for the pilot valve 346, causing the pilot valve 346 to close. However, as depicted, the relief valve 336 remains closed until the pressure in the primary line 212 reaches or exceeds the selected pressure threshold for the relief valve 336, at which point the relief valve 336 will open.

In one or more embodiments, the selected pressure threshold for the relief valve 336 may be the cracking pressure at which the relief valve 336 just opens to allow the hydraulic fluid to flow through the relief valve 336. Once the pressure reaches a full-flow pressure of the relief valve 336, the relief valve 336 fully opens and allows its full rated flow through the relief valve 336.

Figure 6:
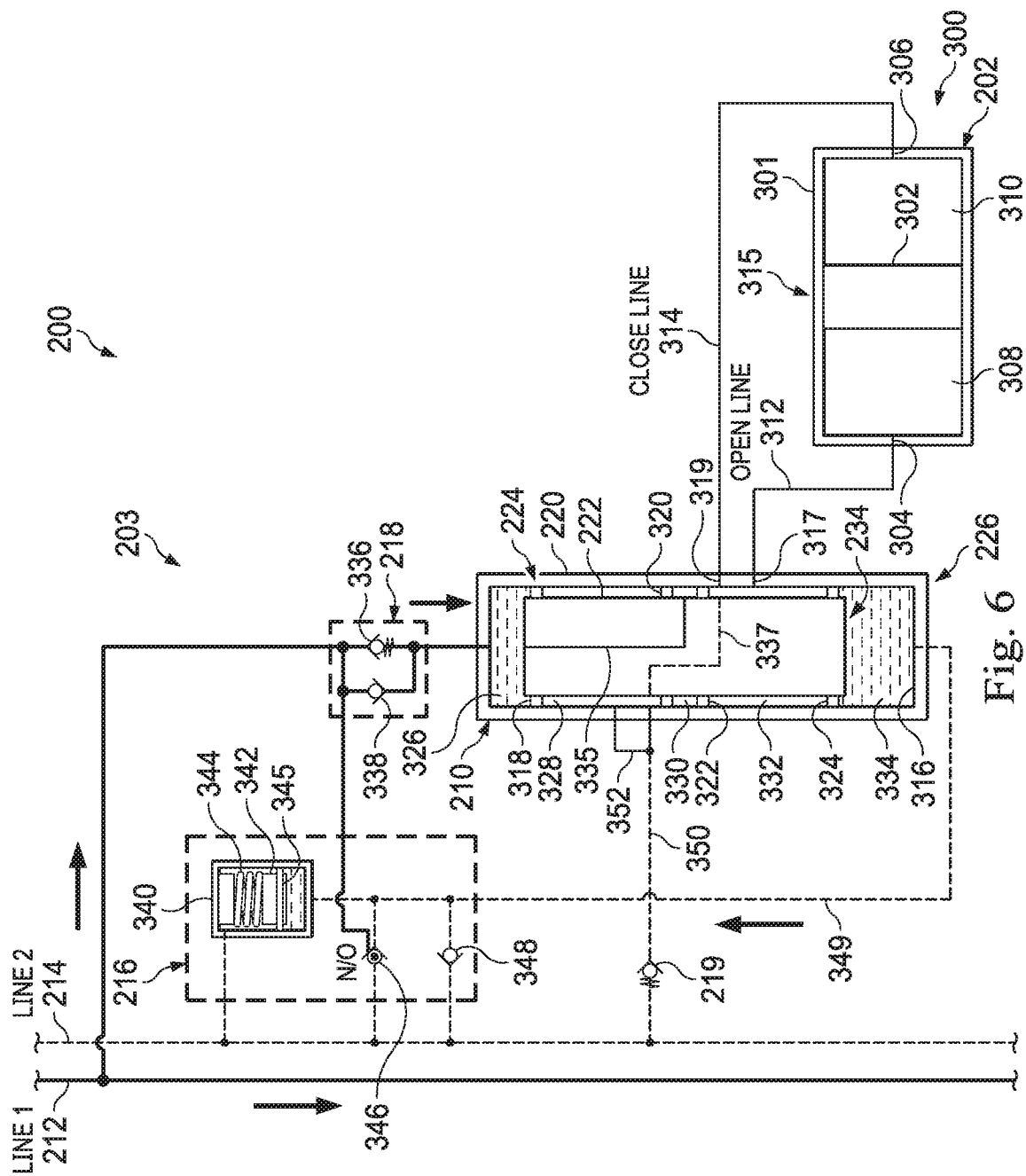
FIG. 6 is a schematic diagram of yet another configuration of the first controller and the first control valve of FIG. 3 during the first pressure cycle of the operating sequence, according to an example embodiment of the present disclosure.

In FIG. 6, the pressure in the primary line 212 has reached the full-flow pressure of the relief valve 336 such that the relief valve 336 is now fully open. Both the pilot valve 346 and the outlet relief valve 219 remain closed.

With the relief valve 336 open, hydraulic fluid in the primary line 212 flows through the relief valve 336 and moves into the first chamber 326 of the indexing system 210. As the hydraulic fluid moves into the first chamber 326, the pressure within the first chamber 326 increases, causing the piston 222 to be displaced within the housing 220. In particular, the piston 222 is moved in a first direction from the reset position 232 into the blank position 234, thereby causing a portion of the hydraulic fluid in the fifth chamber 334 to move out of the fifth chamber 334. The first direction may be, for example, downwards.

The hydraulic fluid that is pushed out of the fifth chamber 334 moves into the fluid line 349. This hydraulic fluid is unable to bypass the check valve 348, which blocks that direction of flow, or bypass the pilot valve 346, which remains closed. But the hydraulic fluid is able to move through the fluid line 349 and into the housing 340 of the metering system 216. As the hydraulic fluid moves into the housing 340 of the metering system 216, the piston 342 of the metering system 216 is moved in a second direction, thereby compressing the spring 344 attached to the piston 342. The second direction may be, for example, upwards.

When the piston 222 is in the blank position 234, the open line 312 and the close line 314 both remain in fluid communication with the same chamber, which is the fourth chamber 332. Thus, the first control valve 202 remains equalized. In other words, when the piston 222 is in the blank position 234, there is no effect on the state of the first control valve 202.

Figure 7:
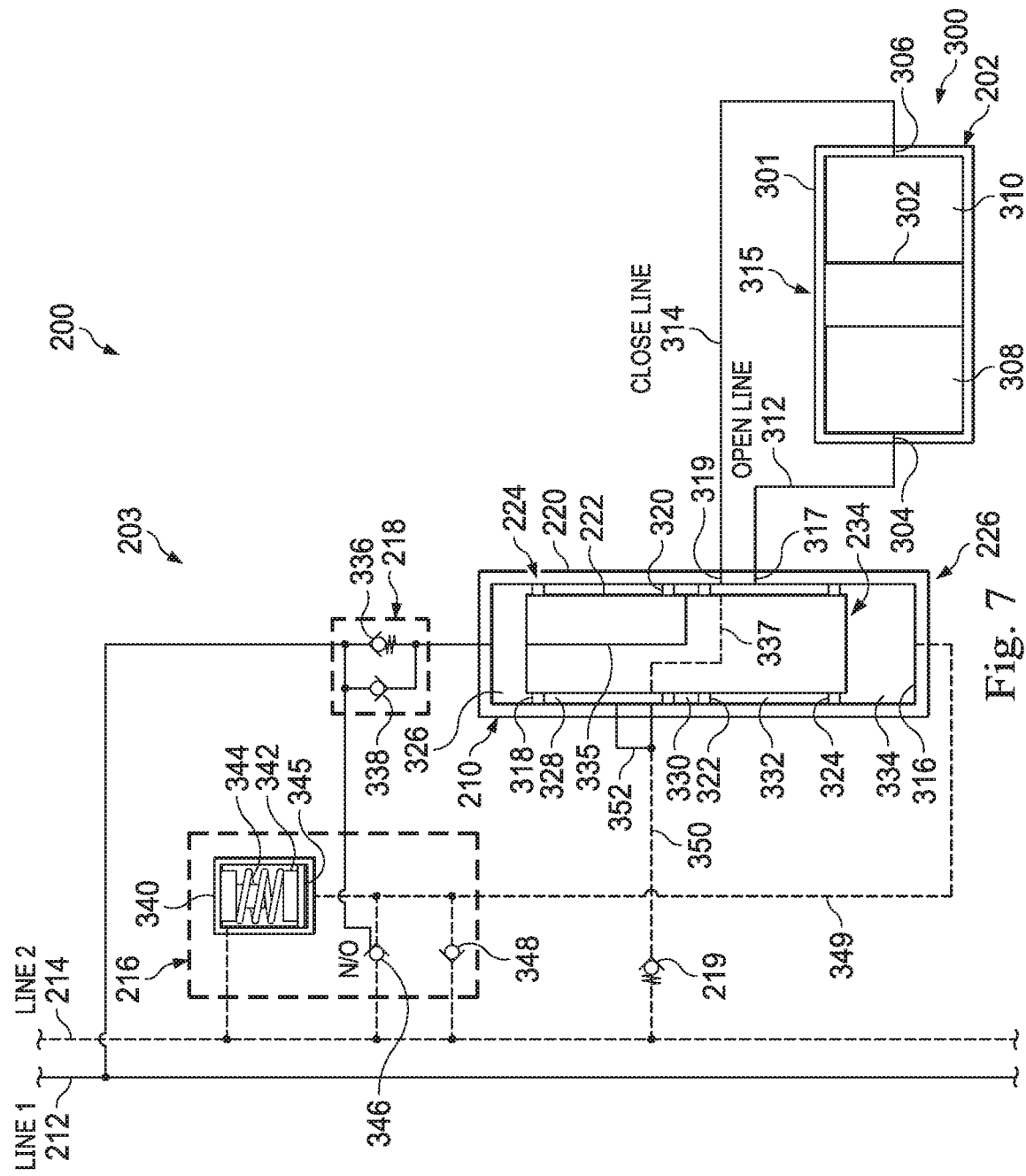
FIG. 7 is a schematic diagram of yet another configuration of the first controller and the first control valve of FIG. 3 during the first pressure cycle of the operating sequence, according to an example embodiment of the present disclosure.

In FIG. 7, after the piston 222 has been moved to the blank position 234, the primary line 212 may be vented. In other words, the pressure in the primary line 212 is reduced. For example, the rate at which hydraulic fluid is transferred from the hydraulic pump unit 208 into the primary line 212 may be reduced.

In one or more embodiments, the pressurization of the primary line 212 that moves the piston 222 into a new position and the venting of the primary line 212 may be referred to as one pressure cycle for the primary line 212. Thus, the pressurization of the primary line 212 described in FIGS. 4-6 and the venting of the primary line 212 described in FIG. 7 complete a first pressure cycle for the primary line 212 in the operating sequence 230.

In one or more embodiments, reducing the pressure in the primary line 212 equalizes the primary line 212 and the secondary line 214. This equalization may keep piston 222 in the blank position 234 and the first control valve 202 in the default state 300.

Further, reducing the pressure in the primary line 212 causes the relief valve 336 to close and the pilot valve 346 to open. The relief valve 336 may close when, for example, the pressure in the primary line 212 reduces to some percentage of the cracking pressure the relief valve 336 or some percentage of the full-flow pressure of the relief valve 336. In one example embodiment, this percentage may be about 20 percent, 25 percent, 30 percent, or some other percentage. In some embodiments, the relief valve 336 may close when the pressure in the primary line 212 drops below the cracking pressure of the relief valve 336.

The pilot valve 346 opens back up when the pressure in the primary line 212 drops below the selected pressure threshold of the pilot valve 346. With the pilot valve 346 open, the hydraulic fluid that has been compressed in the fluid line 349 may now flow into the secondary line 214 through the pilot valve 346. Further, hydraulic fluid in the housing 340 of the metering system 216 may move out of the housing 340, through the fluid line 349, and through the pilot valve 346. As the hydraulic fluid moves out of the housing 340, the spring 344 of the metering system 216 pushes down on the piston 342 of the metering system 216 to move the piston 342 back into its original position.

Figure 8:
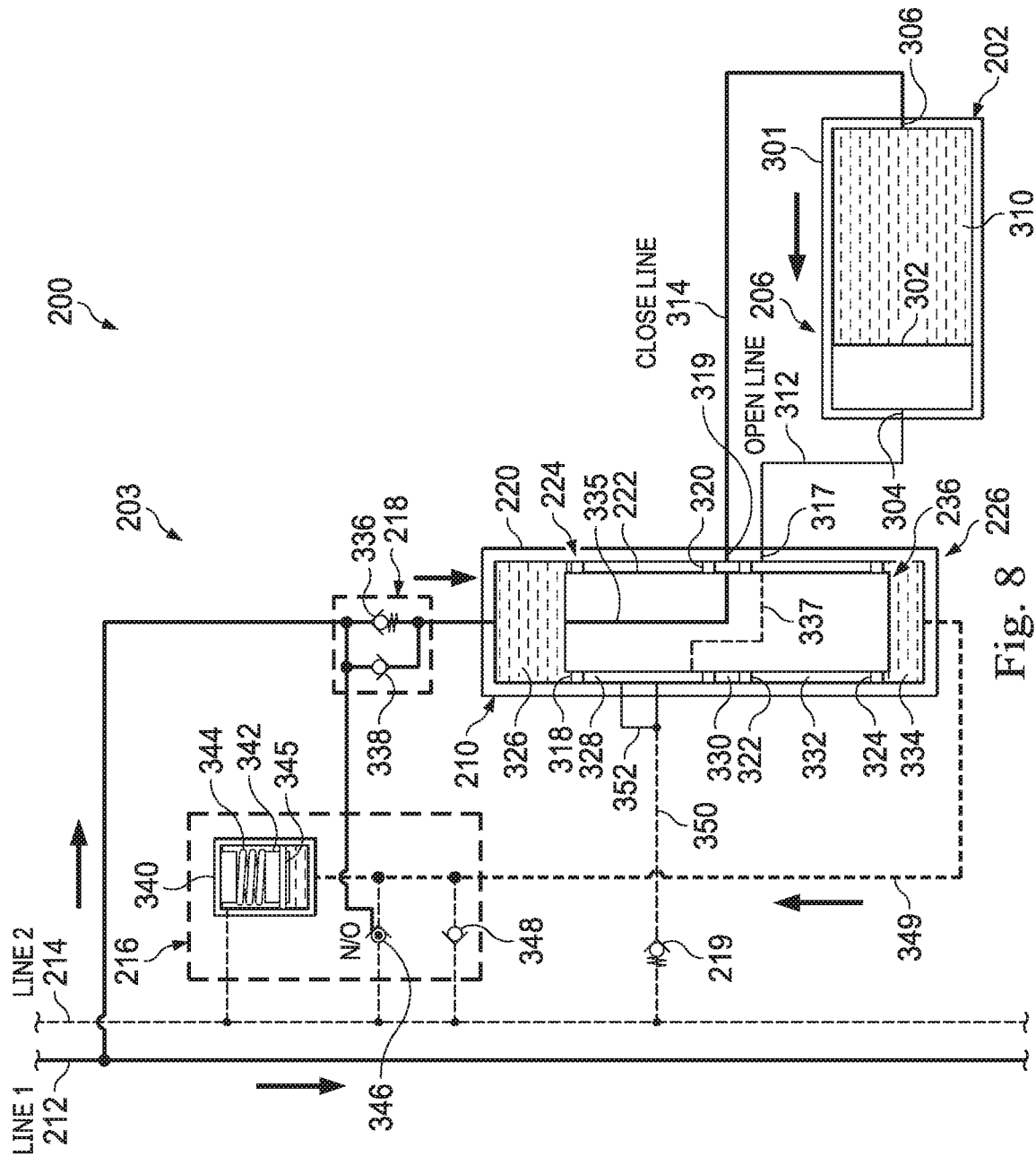
FIG. 8 is a schematic diagram of yet another configuration of the first controller and the first control valve of FIG. 3 during a second pressure cycle of the operating sequence, according to an example embodiment of the present disclosure.

In FIG. 8, the primary line 212 is again pressurized. The pressure in the primary line 212 first causes the pilot valve 346 to close. Once the pressure in the primary line 212 reaches the cracking pressure of the relief valve 336, the relief valve 336 opens. The pressure further builds up until the pressure reaches the full-flow pressure of the relief valve 336 and the relief valve 336 fully opens.

When the relief valve 336 opens, the hydraulic fluid in the primary line 212 moves into the first chamber 326 and displaces the piston 222. In other words, the piston 222 moves downwards from the blank position 234 into the close position 236. As the piston 222 moves downwards, a portion of the hydraulic fluid in the fifth chamber 334 moves out of the fifth chamber 334 and into the fluid line 349. The hydraulic fluid is moved through the fluid line 349 and into the housing 340 of the metering system 216. When the hydraulic fluid moves into the housing 340, the piston 342 of the metering system 216 is pushed upward, compressing the spring 344 of the metering system 216.

With the piston 222 in the close position, the open line 312 and the close line 314 are now in fluid communication with two different chambers of the indexing system 210. In particular, the close line 314 is in fluid communication with the third chamber 330 and the open line 312 is in fluid communication with the fourth chamber 332.

Thus, hydraulic fluid that moves into the first chamber 326, flows into the first channel 335, and moves into the third chamber 330 only moves through the close line 314 and not through the open line 312. The hydraulic fluid moves through the close line 314, through the second port 306, and into the second space 310 within the housing 301 of the first control valve 202. As the hydraulic fluid moves into the second space 310, the plunger 302 is pushed towards the first port 304 to switch the first control valve 202 to the closed state 206.

As the plunger 302 is moved towards the first port 304, the hydraulic fluid in the first space 308 within the housing 301 of the control valve is moved out through the first port 304 and through the open line 312. This hydraulic fluid moves through the open line 312 and into the fourth chamber 332. Further, a portion of the hydraulic fluid in the fourth chamber 332 may move through the second channel 337 in the piston 222 and into the second chamber 328. The hydraulic fluid in the second chamber 328 will move into the fluid line 350 and cause a buildup of pressure at an inlet of the outlet relief valve 219. Once the buildup of pressure at the inlet of the outlet relief valve 219 reaches or exceeds a selected pressure threshold, the outlet relief valve 219 opens or "cracks," causing the hydraulic fluid to move into the secondary line 214. The hydraulic fluid that is moved into the secondary line 214 may be vented through the hydraulic pump unit 208 shown in FIG. 2.

Figure 9:
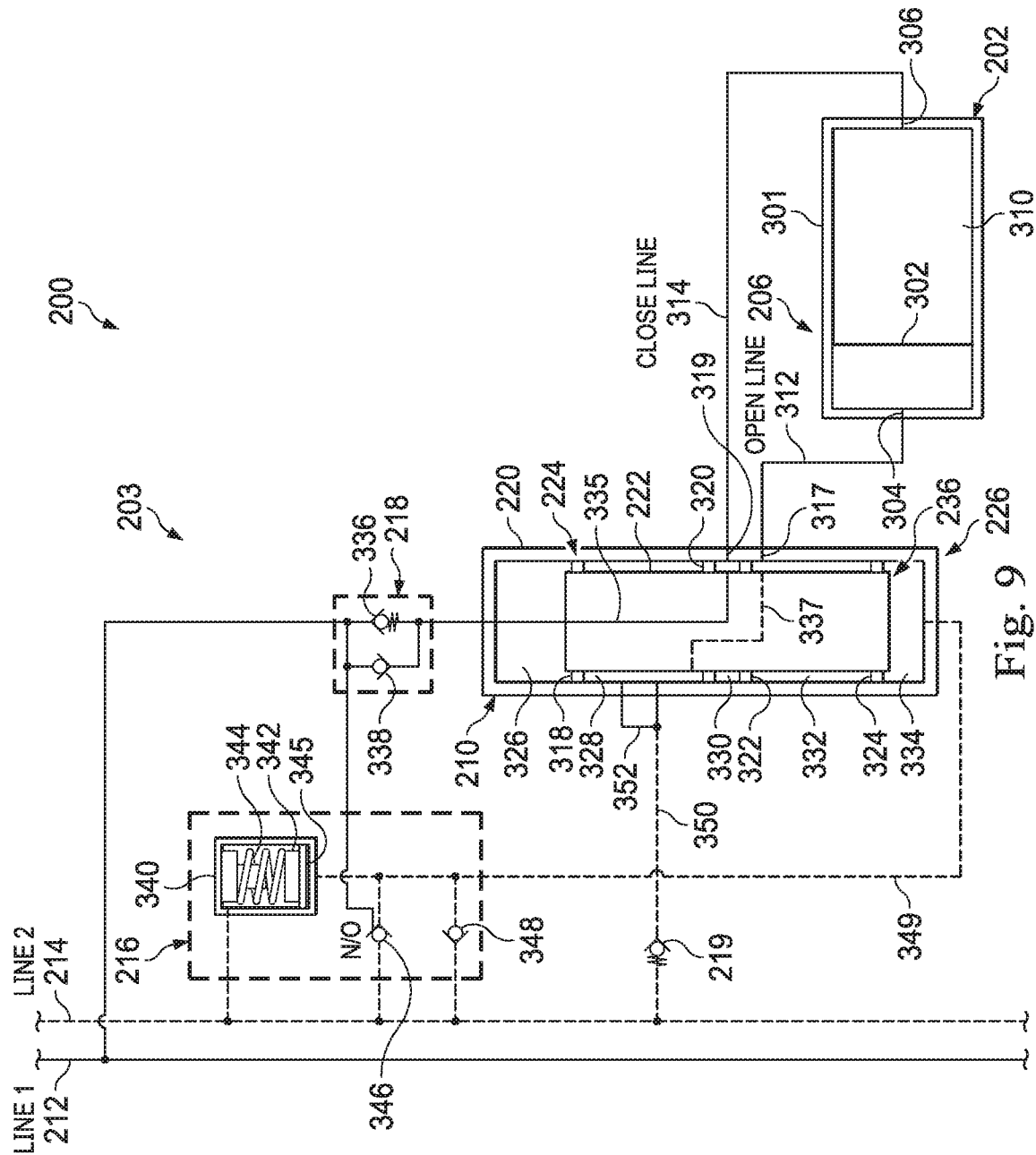
FIG. 9 is a schematic diagram of yet another configuration of the first controller and the first control valve of FIG. 3 during the second pressure cycle of the operating sequence, according to an example embodiment of the present disclosure.

In FIG. 9, after the piston 222 has been moved to the close position 236, the primary line 212 may be vented. In other words, the pressure in the primary line 212 is reduced. The pressurization of the primary line 212 described in FIG. 8 and the venting of the primary line 212 described in FIG. 9 complete a second pressure cycle for the primary line 212 in the operating sequence 230.

Reducing the pressure in the primary line 212 equalizes the primary line 212 and the secondary line 214. This equalization may keep piston 222 in the close position 236 and the first control valve 202 in the closed state 206.

Further, reducing the pressure in the primary line 212 causes the relief valve 336 to close and the pilot valve 346 to open. With the pilot valve 346 open, hydraulic fluid may flow from the fluid line 349, which is fluidly connected to the fifth chamber 334, into the secondary line 214. Further, with the pilot valve 346 open, hydraulic fluid in the housing 340 of the metering system 216 may move out of the housing 340 and into the secondary line 214. As the hydraulic fluid moves out of the housing 340, the spring 344 of the metering system 216 pushes down on the piston 342 of the metering system 216.

Figure 10:
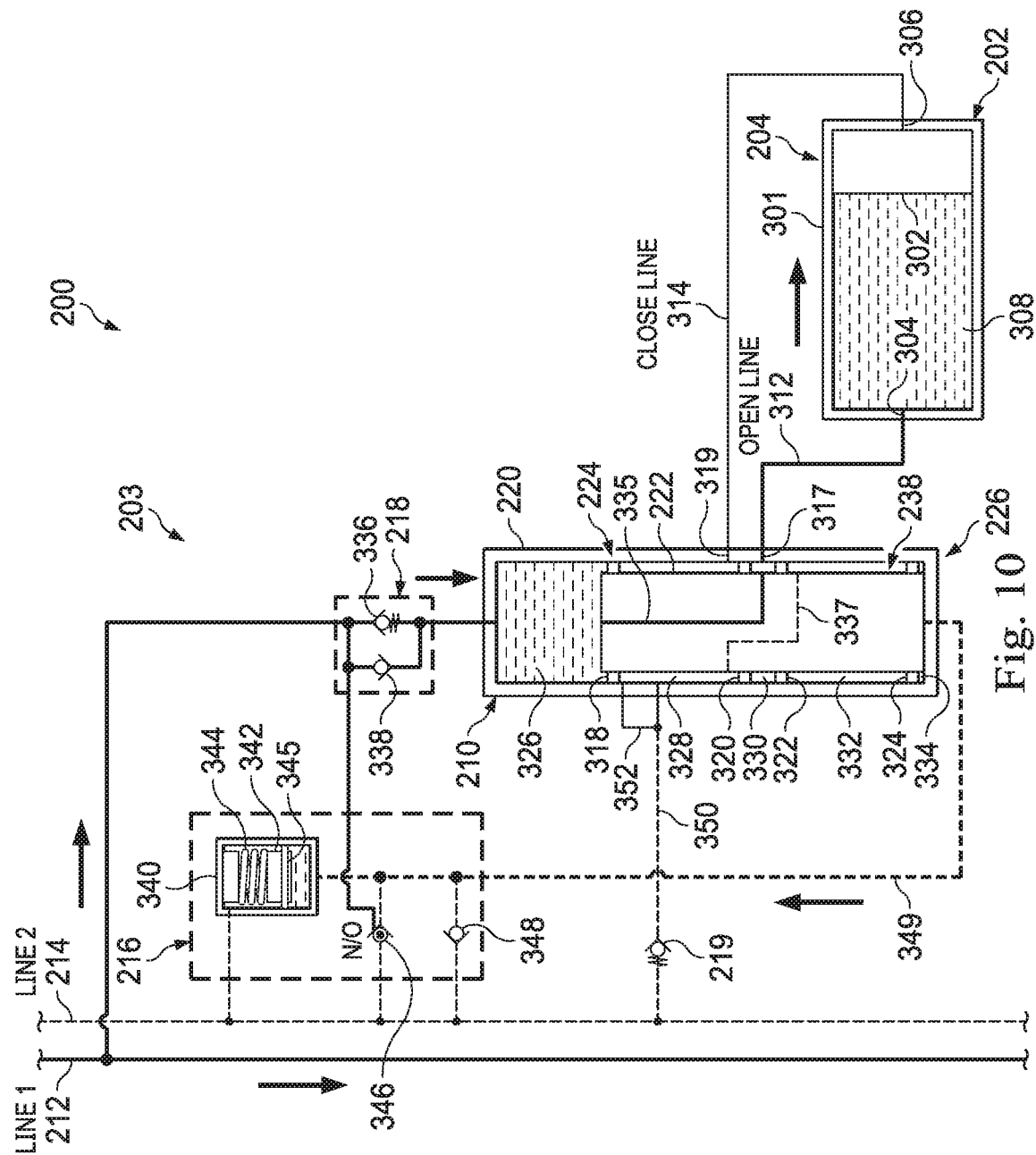
FIG. 10 is a schematic diagram of yet another configuration of the first controller and the first control valve of FIG. 3 during a third pressure cycle of the operating sequence, according to an example embodiment.

In FIG. 10, the primary line 212 is again pressurized. The pressure in the primary line 212 first causes the pilot valve 346 to close and then causes the relief valve 336 to open. When the relief valve 336 opens, the hydraulic fluid in the primary line 212 moves into the first chamber 326 and displaces the piston 222. In other words, the piston 222 moves downwards from the close position 236 into the open position 238. As the piston 222 moves downward, the hydraulic fluid in the fifth chamber 334 moves out of the fifth chamber 334 and into the fluid line 349. The hydraulic fluid is moved through the fluid line 349 and into the housing 340 of the metering system 216. When the hydraulic fluid moves into the housing 340, the piston 342 of the metering system 216 is pushed upward, compressing the spring 344 of the metering system 216.

With the piston 222 in the open position 238, the open line 312 and the close line 314 are in fluid communication with two different chambers of the indexing system 210. In particular, the close line 314 is in fluid communication with the second chamber 328 and the open line 312 is in fluid communication with the third chamber 330.

Thus, hydraulic fluid that moves into the first chamber 326, flows into the first channel 335, and moves into the third chamber 330 only moves through the open line 312 and not through the close line 314. The hydraulic fluid moves through the open line 312 and into the housing 301 of the first control valve 202 through the first port 304. As the hydraulic fluid enters the first port 304, the plunger 302 is pushed towards the second port 306 to switch the first control valve 202 to the open state 204.

Further, as the plunger 302 is moved towards the second port 306, the hydraulic fluid previously in the second space 310 within the housing 301 of the control valve is moved out through the second port 306 and through the close line 314. This hydraulic fluid moves through the close line 314 and into the second chamber 328. Further, a portion of the hydraulic fluid in the second chamber 328 may move through the second channel 337 in the piston 222 and into the fourth chamber 332.

The hydraulic fluid in the second chamber 328 will move into the fluid line 350 and cause a buildup of pressure at an inlet of the outlet relief valve 219. Once the buildup of pressure at the inlet of the outlet relief valve 219 reaches or exceeds a selected pressure threshold, the outlet relief valve 219 opens or "cracks," causing the hydraulic fluid to move into the secondary line 214. The hydraulic fluid that is moved into the secondary line 214 may be vented through the hydraulic pump unit 208 shown in FIG. 2.

Figure 11:
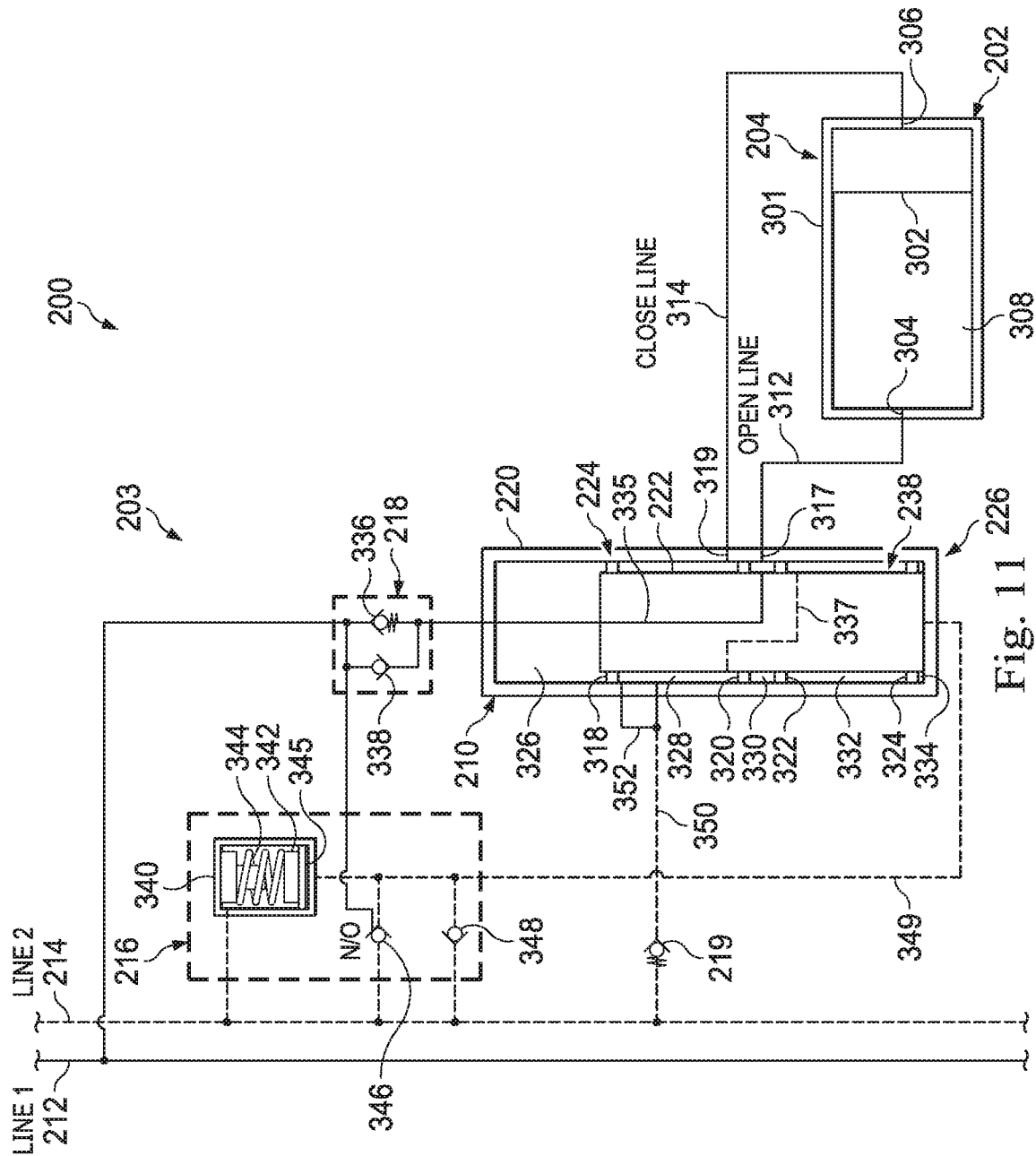
FIG. 11 is a schematic diagram of yet another configuration of the first controller and the first control valve of FIG. 3 during the third pressure cycle of the operating sequence, according to an example embodiment.

In FIG. 11, after the piston 222 has been moved to the open position 238, the primary line 212 may be vented. The pressurization of the primary line 212 described in FIG. 10 and the venting of the primary line 212 described in FIG. 11 complete a third pressure cycle for the primary line 212 in the operating sequence 230.

Reducing the pressure in the primary line 212 equalizes the primary line 212 and the secondary line 214. This equalization may keep piston 222 in the open position 238 and the first control valve 202 in the open state 204.

Further, reducing the pressure in the primary line 212 causes the relief valve 336 to close and the pilot valve 346 to open. With the pilot valve 346 open, hydraulic fluid that flows from the fifth chamber 334 into the fluid line 349 may now flow into the secondary line 214. Further, with the pilot valve 346 open, hydraulic fluid in the housing 340 of the metering system 216 may move out of the housing 340 and into through the secondary line 214. As the hydraulic fluid moves out of the housing 340, the spring 344 of the metering system 216 pushes down on the piston 342 of the metering system 216.

Figure 12:
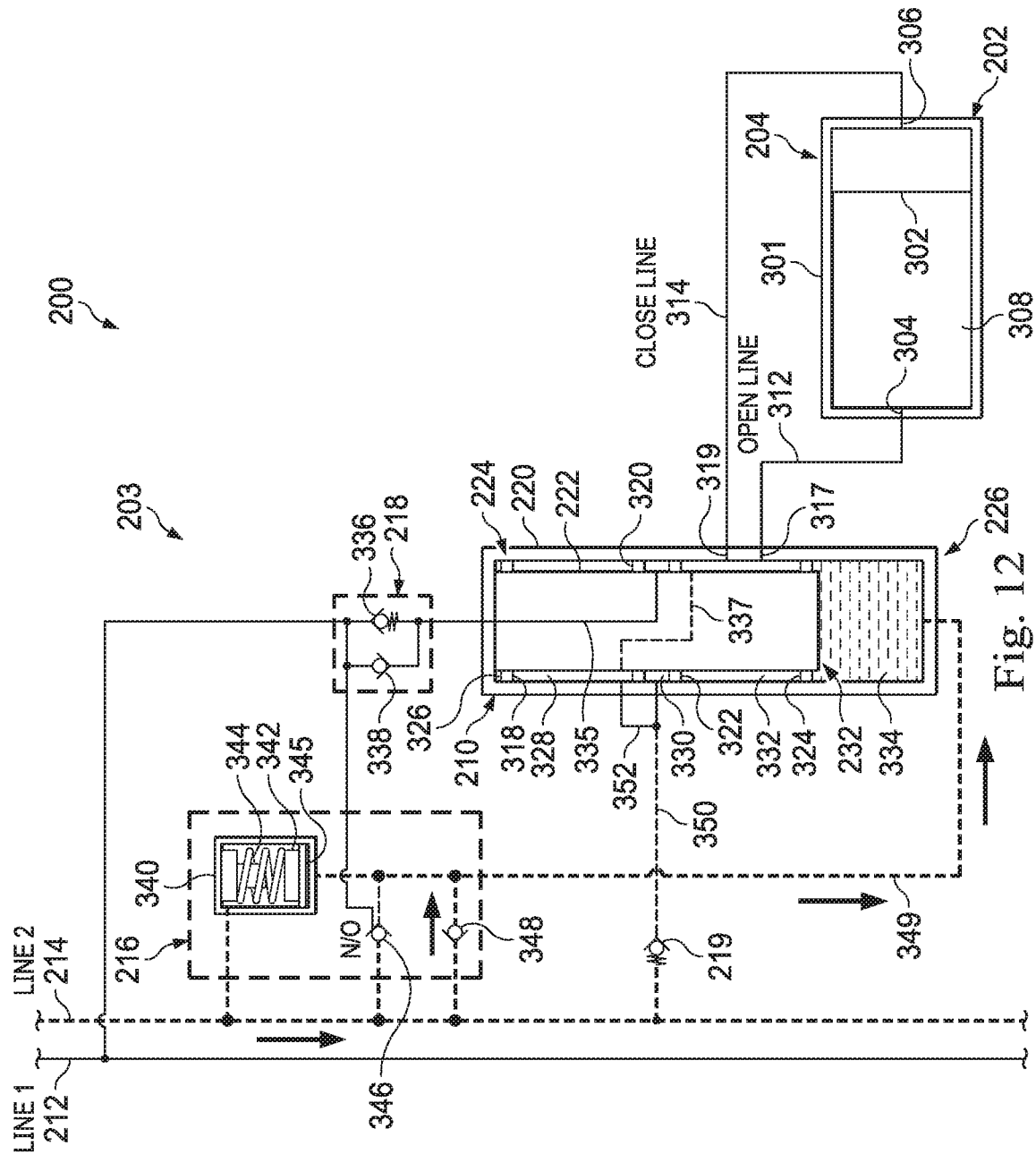
FIG. 12 is a schematic diagram of yet another configuration of the first controller and the first control valve of FIG. 3 during a reset pressure cycle of the operating sequence, according to an example embodiment.

In FIG. 12, the secondary line 214 is pressurized to move the piston 222 back into the reset position 232. Pressurizing the secondary line 214 causes the hydraulic fluid in the secondary line 214 to move through the check valve 348 and into the fifth chamber 334 of the indexing system 210. The hydraulic fluid moving into the fifth chamber 334 pushes the piston 222 back upwards into the reset position 232. In the reset position 232, the open line 312 and the close line 314 are again in fluid communication with the same chamber such that first control valve 202 is equalized. The outlet relief valve 219 may remain closed and function as a check valve that prevents hydraulic fluid in the secondary line 214 from moving into the indexing system 210.

Figure 13:
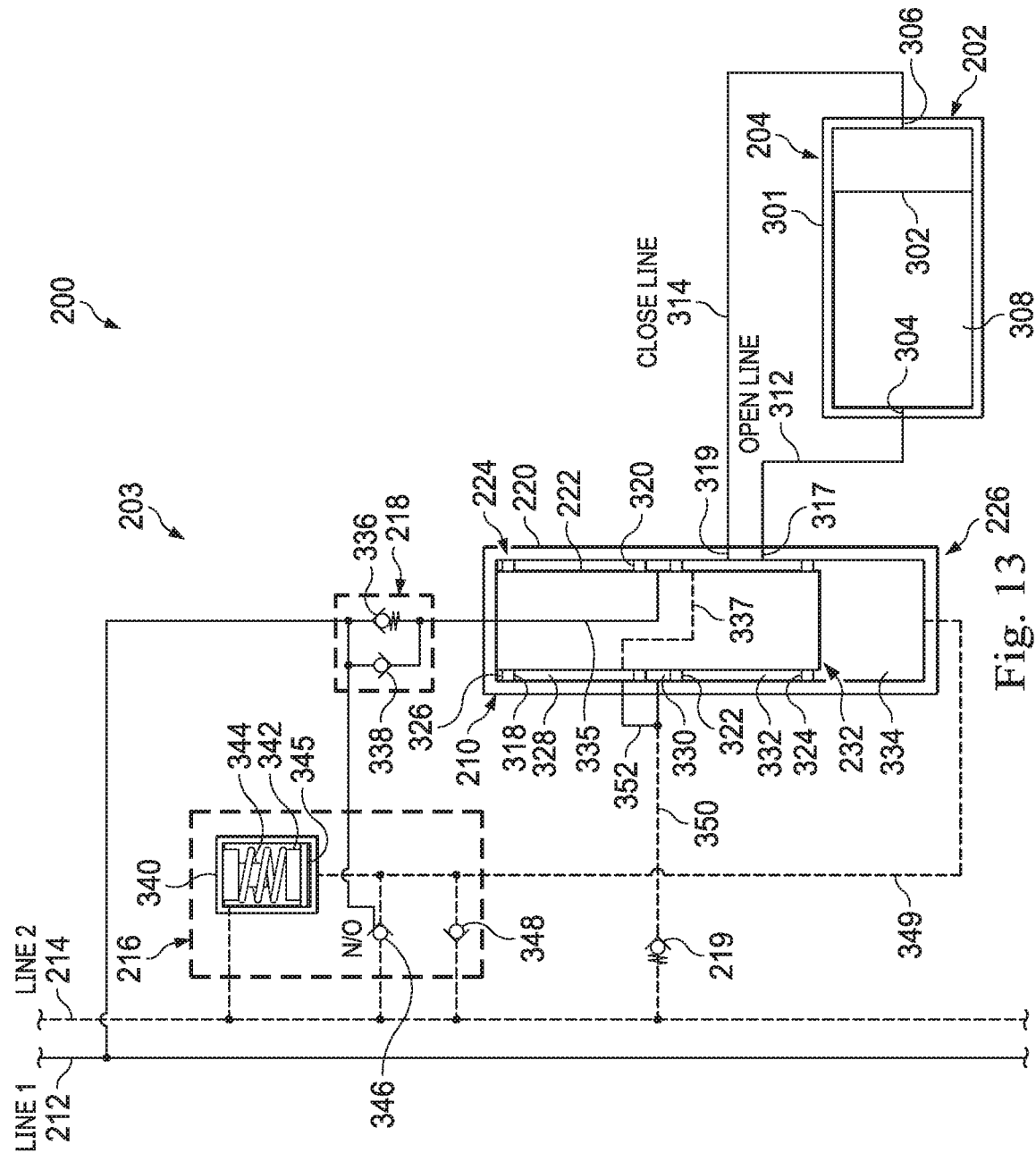
FIG. 13 is a schematic diagram of yet another configuration of the first controller and the first control valve of FIG. 3 during the reset pressure cycle of the operating sequence, according to an example embodiment.

In FIG. 13, with the piston 222 now back in the reset position 232, the secondary line 214 may be vented. In other words, the pressure in the secondary line 214 may be reduced. The primary line 212 and the secondary line 214 then may equalize, or, in some cases, the secondary line 214 pressure may exceed the pressure in the primary line 212. With the secondary line 214 pressure being higher or equal to the pressure in the primary line 212, the pilot valve 346 remains open. With the pilot valve 346 open, the hydraulic fluid in the fifth chamber 334 may move into the fluid line 349 and into the secondary line 214. Venting of the secondary line 214 completes a pressure cycle for the secondary line 214. In one or more embodiments, this pressure cycle of the secondary line 214 completes the final cycle of the operating sequence 230. The operating sequence 230 described in FIGS. 4-13 may be repeated any number of times to control the state of the first control valve 202.

In other embodiments, venting of the secondary line 214 completes only a portion of the operating sequence 230. For example, in one or more embodiments, the operating sequence 230 may be comprised of a first sequence for controlling the first control valve 202 and a second sequence for controlling another control valve. In one example embodiment, the above-described pressure cycle for the secondary line 214 may complete the first sequence for the first control valve 202 but also begin the second sequence for the second control valve 244, described below in FIG. 14.

Figure 14:
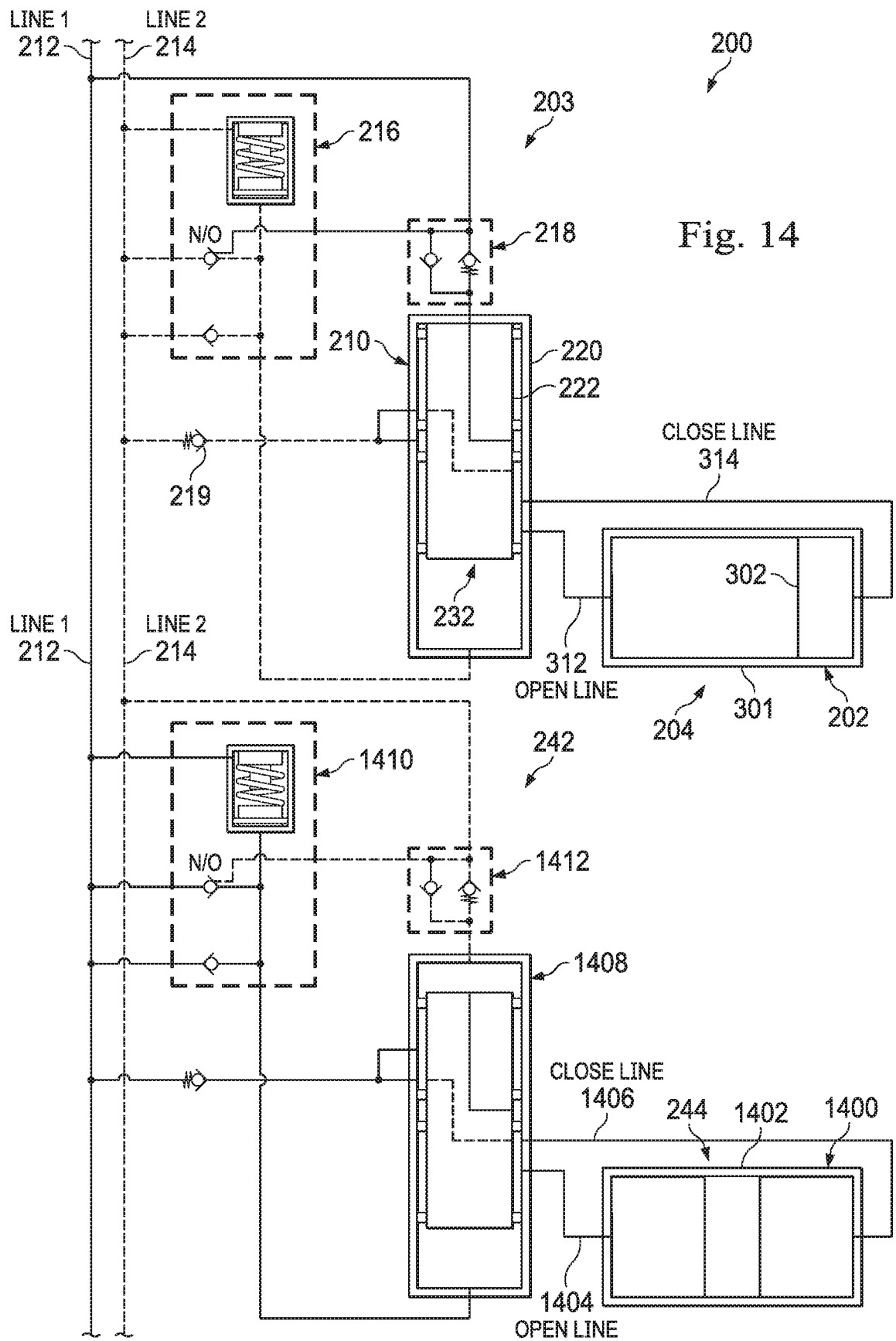
FIG. 14 is a schematic diagram of yet another configuration of the first and second controllers and first and second control valves, according to an example embodiment.

FIG. 14 is a schematic diagram of the control system 200 including the first controller 203, the first control valve 202, the second controller 242, and the second control valve 244. The second control valve 244 is implemented in a manner similar to the first control valve 202. The second control valve 244 includes a housing 1400 and a plunger 1402 located inside the housing 1400. Further, the second control valve 244 is fluidly connected to the second controller 242 through an open line 1404 and a close line 1406.

The second controller 242 is implemented in a manner similar to the first controller 203. The primary line 212 and the secondary line 214 are shared by the first controller 203 and the second controller 242. Further, the second controller 242 includes an indexing system 1408, a metering system

1410, a relief manifold 1412, and an outlet relief valve 1414, which are implemented in a manner similar to the indexing system 210, the metering system 216, and the relief manifold 218, respectively, of the first controller 203. The indexing system 1408 includes a housing 1416 and a piston 1418 located within the housing 1416.

In FIG. 14, the first controller 203 is shown with the piston 222 in the reset position 232 and the first control valve 202 in the open state 204. The piston 1418 of the indexing system 1408 of the second controller 242 is shown in a blank position 1420 with the second control valve 244 in a default state 1422.

In one or more embodiments, the secondary line 214 functions and is used in much the same way for the second controller 242 as the primary line 212 functions and is used for the first controller 203. Further, the primary line 212 functions and is used in much the same for the second controller 242 as the secondary line 214 functions and is used for the first controller 203. For example, the primary line 212 and the secondary line 214 are fluidly connected to the various components of the second controller 242 in the opposite way that the primary line 212 and the secondary line 214 are fluidly connected to the various components of the first controller 203. In other words, the roles of the primary line 212 and the secondary line 214 in the second controller 242 are reversed as compared to their roles in the first controller 203.

In one or more embodiments, when the secondary line 214 is pressurized as described in FIG. 12, a second operating sequence for the second control valve 244 begins. Pressurization of the secondary line 214 moves the piston 1418 of the indexing system 1408 of the second controller 242 from a reset position to the blank position 1420, similar to the manner in which the initial pressurization of the primary line 212 moved the piston 222 of the indexing system 210 of the first controller 203 from the reset position 232 to the blank position 234. Thus, pressurization of the secondary line 214 causes the piston 1418 to move from the reset position to the blank position 1420 within a same pressure cycle that the piston 222 is moved back into the reset position 232.

Venting of the secondary line 214 as described in FIG. 13 completes the operating sequence for the first controller 203 and completes a first pressure cycle for the secondary line 214 according to a second operating sequence for the second controller 242. The secondary line 214 may be pressurized and vented in two additional pressure cycles to move the piston 1418 of the second controller 242 from the blank position 1420 to a close position and then an open position, thereby switching the second control valve 244 from the default state 1422 to a closed state and then an open state, respectively.

Pressurizing the primary line 212 may then move the piston 1418 of the second controller 242 back into the reset position, with venting of the primary line 212 completing the final pressure cycle of the second operating sequence for the second controller 242. Further, the pressurization of the primary line 212 restarts the operating sequence for the first controller 203, moving the piston 222 of the first controller 203 from the reset position 232 to the blank position 234.

During the pressure cycles of the primary line 212 that operate the piston 222 of the first controller 203 and therefore, the first control valve 202, the piston 1418 of the second controller 242 remains in its reset position. The piston 1418 of the second controller 242 may only be moved from the reset position with pressure cycles of the secondary line 214. Similarly, during the pressure cycles of the secondary line 214 that operate the piston 1418 of the second controller 242 and therefore, the second control valve 244, the piston 222 of the first controller 203 remains in its reset position 232. The piston 222 of the first controller 203 may only be moved from the reset position with pressure cycles of the primary line 212.

Thus, the primary line 212 and the secondary line 214 may be used to control two different control valves. In one or more embodiments, a third control valve may be controlled using the primary line 212, the secondary line 214, and a tertiary line of a third controller. This tertiary line would function and be used in much the same way for the third controller as the secondary line 214 is used for the second controller 242. Further, the secondary line 214 would function and be used in much the same way for resetting a piston of an indexing system of the third controller as the primary line 212 is used for resetting the piston 1418 of the second controller 242.

In this manner, the control system 200 may include at least two hydraulic lines for controlling one or more control valves. Two hydraulic lines may be used to control either a single control valve or two control valves. For each additional control valve, a new hydraulic line may be added. For example, three hydraulic lines may be used to control three control valves, four hydraulic lines may be used to control four control valves, and so on.

Figure 15:
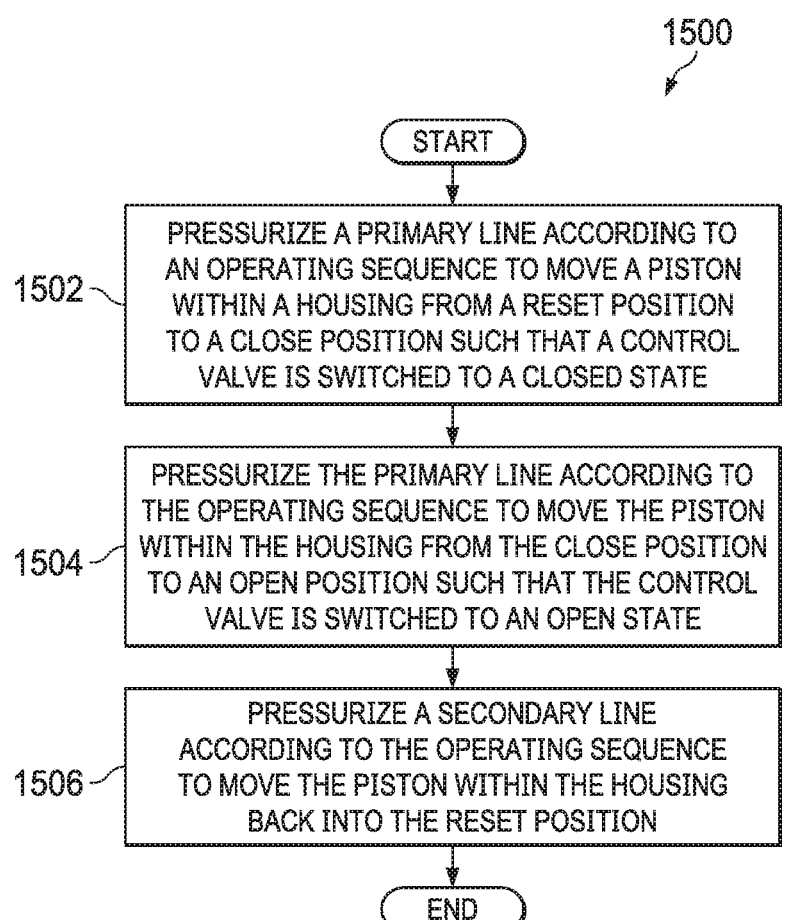
FIG. 15 is a flowchart illustration of a method for controlling one or more control valves, according to an example embodiment.

FIG. 15 is a flowchart illustration of a method 1500 for controlling one or more control valves, with continuing reference to FIGS. 2-14. The method 1500 includes, at step 1502, pressurizing the primary line 212 according to the operating sequence 230 to move the piston 222 within the housing 220 from the reset position 232 to the close position 236 such that the first control valve 202 is switched to the closed state 206. At step 1504, the primary line 212 is pressurized according to the operating sequence 230 to move the piston 222 within the housing 220 from the close position 236 to the open position 238 such that the first control valve 202 is switched to the open state 204. At step 1506, the secondary line 214 is pressurized according to the operating sequence 230 to move the piston 222 within the housing 220 back into the reset position 232.

In some embodiments, pressurizing the primary line 212 in either step 1502 or step 1504 moves the piston 222 within the housing 220 such that one of the open line 312 or the close line 314 is in fluid communication with a control chamber (e.g. third chamber 330) defined between the piston 222 and the housing 220 and the other of the open line 312 or the close line 314 is in fluid communication with an auxiliary chamber (e.g. second chamber 328 or fourth chamber 332) defined between the piston 222 and the housing 220. With this configuration, hydraulic fluid may then move through a channel in the piston 222 through the control chamber and into the one of the open line 312 or the close line 314 to thereby change a state of the first control valve 202, which is fluidly connected to the open line 312 and the close line 314.

Figure 16:
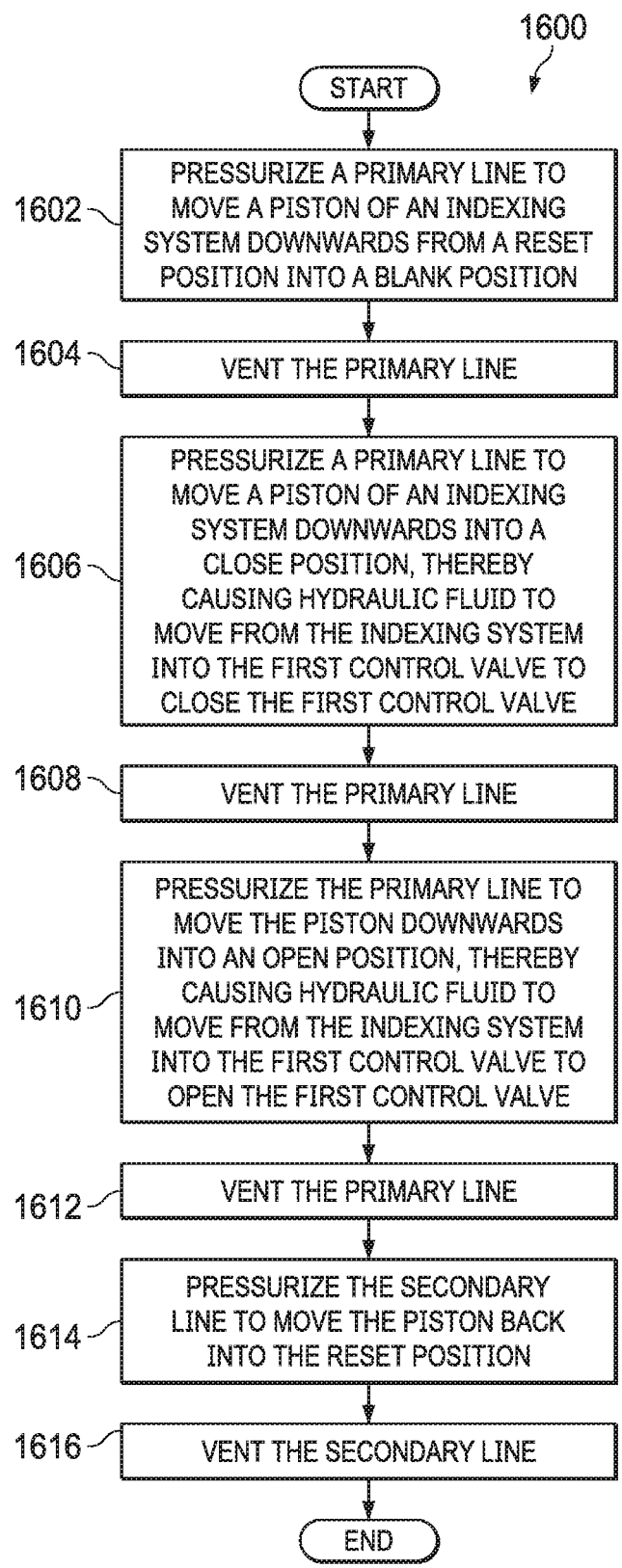
FIG. 16 is a flowchart illustration of a method for controlling one or more control valves, according to an example embodiment.

FIG. 16 is a flowchart illustration of a method 1600 for controlling one or more control valves using an operating sequence 230, with continuing reference to FIGS. 2-14. The method 1600 includes, at step 1602, pressurizing the primary line 212 to move the piston 222 downwards from a reset position 232 into a blank position 234. Next, at step 1604, the primary line 212 is vented.

At step 1606, the primary line 212 is pressurized to move the piston 222 of the indexing system 210 downwards into a close position 236, thereby causing hydraulic fluid to move from the indexing system 210 into the first control valve 202 to close the first control valve 202. At step 1608, the primary line 212 is vented. At step 1610, the primary line 212 is pressurized to move the piston 222 downwards into an open position 238, thereby causing hydraulic fluid to move from the indexing system 210 into the first control valve 202 to open the first control valve 202. At step 1612, the primary line 212 is again vented.

At step 1614, the secondary line 214 is pressurized to move the piston 222 back into the reset position 232. At step 1616, the secondary line 214 is vented, with the method 1600 terminating thereafter.

In one or more embodiments, when the control system 200 is only used to control the first control valve 202, the method 1600 may not include the steps 1602 and 1604. Thus, in these one or more embodiments, the piston 222 may be moved directly from the reset position 232 to the close position 236.

Thus, the different embodiments describe a control system for controlling one or more control valves. In one or more embodiments, the control system 200 described in FIGS. 2-14 provides a purely hydraulic mechanism for switching the hydraulic supply between the ports on each of a set of control valves 201. For example, the control system 200 may use two hydraulic lines, such as the primary line 212 and the secondary line 214 to control up to two control valves. For each additional control valve controlled using the control system 200, an additional hydraulic line may be added. This additional hydraulic line may be a dedicated hydraulic line for controlling the additional control valve, while one of the other hydraulic lines may be used to provide hydrostatic balance and a resetting capability.

As described, the control system 200 may reduce the total number of hydraulic lines that extend from the surface of the well at, for example, the semi-submersible platform 102, to the set of control valves 201. Thus, the cross-sectional area of the tubing string 126 or other tubular extending between the surface and the set of control valves 201 may be reduced. Moreover, as the control system 200 do not require mechanical components that rotate, which may wear over time, the life of these types of control systems may be extended.

Thus, an apparatus includes a first housing, a first piston located within the first housing, a first plurality of seals, a primary line, and a secondary line. The first piston is movable within the first housing between a reset position, a close position, and an open position. The first plurality of seals is fixedly attached to the first piston such that the first plurality of seals defines a first plurality of chambers between the first piston and the first housing. The primary line is fluidly connected to the first plurality of chambers. Pressurization of the primary line according to an operating sequence moves the first piston from the reset position into the close position. Pressurization of the primary line according to the operating sequence moves the first piston from the close position into the open position. The secondary line is fluidly connected to the first plurality of chambers. Pressurization of the secondary line according to the operating sequence moves the first piston back into the reset position.

The first plurality of seals includes four seals that define five chambers between the first piston and the first housing.

Pressurizing the primary line according to the operating sequence moves the first piston from the reset position to a blank position before moving the first piston into the close position and wherein moving the first piston into the blank position does not change a state of the first control valve.

The apparatus further includes a first control valve, wherein pressurizing the primary line according to the operating sequence moves the first piston from the reset position into the close position such that the first control valve is switched to a closed state; wherein pressurizing the primary line according to the operating sequence moves the first piston from the close position into the open position such that the first control valve is switched to an open state; and wherein movement of the first piston into the reset position enables the first piston to be later moved back into the close position to switch the first control valve back to the closed state.

The apparatus further includes an open line and a close line. The open line and the close line are in fluid communication with a same chamber of the first plurality of chambers within the first housing when the first piston is in the reset position and wherein the open line and the close line are in fluid communication with different chambers of the first plurality of chambers within the first housing when the first piston is in the close position and the open position.

The first plurality of chambers includes an index chamber; a control chamber; a first auxiliary chamber; a second auxiliary chamber; and a reset chamber between the first piston and the first housing.

The index chamber and the control chamber are in fluid communication through the first channel within the first piston.

The first auxiliary chamber and the second auxiliary chamber are in fluid communication through the second channel within the first piston.

The apparatus further includes a metering system fluidly connected to the secondary line, wherein hydraulic fluid moves from the reset chamber into the metering system when the first piston is moved in a first direction within the first housing; and wherein the hydraulic fluid moves from the metering system back into the reset chamber when the first piston is moved in a second direction opposite the first direction within the first housing to thereby reset the first piston.

The metering system includes a second housing, a second piston located within the second housing, a pilot-operated valve, and a check valve.

The apparatus further includes a relief valve in fluid communication with the primary line and the index chamber, wherein the relief valve controls a flow of hydraulic fluid from the primary line into the index chamber to thereby control movement of the first piston.

The apparatus further includes an outlet relief valve that allows hydraulic fluid to move from within the first housing into the secondary line.

The apparatus further includes a second housing, a second piston, and a second plurality of seals. The second piston is located within the second housing and movable within the second housing between the reset position, the close position, and the open position. The second plurality of seals is fixedly attached to the second piston such that the second plurality of seals defines a second plurality of chambers between the second piston and the second housing.

The primary line and the secondary line are fluidly connected to the second plurality of chambers and the apparatus further includes a first control valve and a second control valve. Moving the first piston into the close position switches the first control valve to a closed state. Moving the first piston from the close position into the open position switches the first control valve to an open state. Pressurizing the secondary line according to the operating sequence moves the second piston from the reset position to the close position such that the second control valve is switched to the closed state.

Pressurizing the secondary line according to the operating sequence moves the second piston from the close position to the open position such that the second control valve is switched to the open state. Pressurizing the primary line according to the operating sequence moves the second piston into the reset position Thus, a method for controlling one or more control valves is provided. A primary line is pressurized according to an operating sequence to move a first piston within a first housing from a reset position to a close position such that a first control valve is switched to a closed state. The primary line is pressurized according to the operating sequence to move the first piston within the first housing from the close position to an open position such that the first control valve is switched to an open state. The secondary line is pressurized according to the operating sequence to move the first piston within the first housing back into the reset position.

Pressurizing the primary line according to the operating sequence to move the first piston within the first housing from the reset position to the close position includes pressurizing the primary line in at least a first pressure cycle to move the first piston in a first direction within the first housing into the close position such that a close line that is in fluid communication with the first control valve is also in fluid communication with a control chamber that is defined between the first piston and the first housing.

Pressurizing the primary line according to the operating sequence to move the first piston within the first housing from the close position to the open position includes pressurizing the primary line in a second pressure cycle to move the first piston in a first direction within a housing into an open position such that an open line that is in fluid communication with the first control valve is also in fluid communication with a control chamber that is defined between the first piston and the first housing.

Pressurizing the secondary line includes pressurizing the secondary line in a third pressure cycle to move the first piston in a second direction within the first housing from a blank position, the close position, or the open position back into the reset position.

Pressurizing the secondary line causes a second piston within a second housing to move from the reset position to a blank position within a same pressure cycle that the first piston is moved back into the reset position.

The secondary line is pressurized in at least a first pressure cycle according to the operating sequence to move the second piston within the second housing from the reset position to the close position such that a second control valve is switched to the closed state.

The secondary line is pressurized in a second pressure cycle according to the operating sequence to move the second piston within the second housing from the close position to the open position such that the second control valve is switched to the open state.

The primary line is pressurized in a third pressure cycle according to the operating sequence to move the second piston within the second housing back into the reset position and to move the first piston from the reset position into the blank position.

The foregoing description and figures are not drawn to scale, but rather are illustrated to describe various embodiments of the present disclosure in simplistic form. Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Accordingly, the intention is to cover all modifications, equivalents and alternatives falling within the spirit and scope of the disclosure as defined by the appended claims.

In several example embodiments, while different steps, processes, and procedures are described as appearing as distinct acts, one or more of the steps, one or more of the processes, and/or one or more of the procedures could also be performed in different orders, simultaneously and/or sequentially. In several example embodiments, the steps, processes and/or procedures could be merged into one or more steps, processes and/or procedures.

It is understood that variations may be made in the foregoing without departing from the scope of the disclosure. Furthermore, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. An apparatus comprising:
a first housing;
a first piston located within the first housing and movable within the first housing between a reset position, a close position, and an open position;
a first plurality of seals fixedly attached to the first piston such that the first plurality of seals defines a first plurality of chambers between the first piston and the first housing;
a primary line fluidly connected to the first plurality of chambers, wherein pressurization of the primary line according to an operating sequence moves the first piston from the reset position into the close position such that a first control valve is switched to a closed state; and wherein pressurization of the primary line according to the operating sequence moves the first piston from the close position into the open position such that the first control valve is switched to an open state; and a secondary line fluidly connected to the first plurality of chambers, wherein pressurization of the secondary line according to the operating sequence moves the first piston back into the reset position.

2. The apparatus of claim 1, wherein the first plurality of seals includes four seals that define five chambers between the first piston and the first housing.

3. The apparatus of claim 1,
wherein movement of the first piston into the reset position enables the first piston to be later moved back into the close position to switch the first control valve back to the closed state.

4. The apparatus of claim 3, wherein pressurizing the primary line according to the operating sequence moves the first piston from the reset position to a blank position before moving the first piston into the close position and wherein moving the first piston into the blank position does not change a state of the first control valve.

5. The apparatus of claim 1, further comprising:
an open line; and
a close line, wherein the open line and the close line are in fluid communication with a same chamber of the first plurality of chambers within the first housing when the first piston is in the reset position and wherein the open line and the close line are in fluid communication with different chambers of the first plurality of chambers within the first housing when the first piston is in the close position and the open position.

6. The apparatus of claim 1, wherein the first plurality of chambers comprises:
an index chamber;
a control chamber;
a first auxiliary chamber;
a second auxiliary chamber; and
a reset chamber between the first piston and the first housing.

7. The apparatus of claim 6, wherein the index chamber and the control chamber are in fluid communication through a first channel within the first piston.

8. The apparatus of claim 6, wherein the first auxiliary chamber and the second auxiliary chamber are in fluid communication through a second channel within the first piston.

9. The apparatus of claim 6, further comprising:
a metering system fluidly connected to the secondary line, wherein hydraulic fluid moves from the reset chamber into the metering system when the first piston is moved in a first direction within the first housing; and
wherein the hydraulic fluid moves from the metering system back into the reset chamber when the first piston is moved in a second direction opposite the first direction within the first housing to thereby reset the first piston.

10. The apparatus of claim 9, wherein the metering system includes a second housing, a second piston located within the second housing, a pilot valve, and a check valve.

11. The apparatus of claim 6, further comprising:

a relief valve in fluid communication with the primary line and the index chamber, wherein the relief valve controls a flow of hydraulic fluid from the primary line into the index chamber to thereby control movement of the first piston.

12. The apparatus of claim 1, further comprising:
an outlet relief valve that allows hydraulic fluid to move from within the first housing into the secondary line.

13. The apparatus of claim 1, further comprising:
a second housing;
a second piston located within the second housing and movable within the second housing between the reset position, the close position, and the open position; and
a second plurality of seals fixedly attached to the second piston such that the second plurality of seals defines a second plurality of chambers between the second piston and the second housing.

14. The apparatus of claim 13, wherein the primary line and the secondary line are fluidly connected to the second plurality of chambers, and further comprising:
a second control valve,
wherein pressurizing the secondary line according to the operating sequence moves the second piston from the reset position to the close position such that the second control valve is switched to the closed state;
wherein pressurizing the secondary line according to the operating sequence moves the second piston from the close position to the open position such that the second control valve is switched to the open state; and
wherein pressurizing the primary line according to the operating sequence moves the second piston into the reset position.

15. A method comprising:
pressurizing a primary line according to an operating sequence to move a first piston within a first housing from a reset position to a close position such that a first control valve is switched to a closed state;
pressurizing the primary line according to the operating sequence to move the first piston within the first housing from the close position to an open position such that the first control valve is switched to an open state; and
pressurizing a secondary line according to the operating sequence to move the first piston within the first housing back into the reset position.

16. The method of claim 15, wherein pressurizing the primary line according to the operating sequence to move the first piston within the first housing from the reset position to the close position comprises:
pressurizing the primary line in at least a first pressure cycle to move the first piston in a first direction within the first housing into the close position such that a close line that is in fluid communication with the first control valve is also in fluid communication with a control chamber that is defined between the first piston and the first housing.

17. The method of claim 16, wherein pressurizing the primary line according to the operating sequence to move the first piston within the first housing from the close position to the open position comprises:
pressurizing the primary line in a second pressure cycle to move the first piston in a first direction within a housing into an open position such that an open line that is in fluid communication with the first control valve is also in fluid communication with a control chamber that is defined between the first piston and the first housing.

18. The method of claim 17, wherein pressurizing the secondary line comprises:
pressurizing the secondary line in a third pressure cycle to move the first piston in a second direction within the first housing from a blank position, the close position, or the open position back into the reset position.

19. The method of claim 15, wherein pressurizing the secondary line causes a second piston within a second housing to move from the reset position to a blank position within a same pressure cycle that the first piston is moved back into the reset position.

20. The method of claim 19, further comprising:
pressurizing the secondary line in at least a first pressure cycle according to the operating sequence to move the second piston within the second housing from the reset position to the close position such that a second control valve is switched to the closed state;
pressurizing the secondary line in a second pressure cycle according to the operating sequence to move the second piston within the second housing from the close position to the open position such that the second control valve is switched to the open state; and
pressurizing the primary line in a third pressure cycle according to the operating sequence to move the second piston within the second housing back into the reset position and to move the first piston from the reset position into the blank position.

* * * * *